US 9,777,753 B2

United States Patent
Niiyama et al.

(10) Patent No.: US 9,777,753 B2
(45) Date of Patent: Oct. 3, 2017

(54) METHODS AND APPARATUS FOR SHAPE CONTROL

(71) Applicants: Ryuma Niiyama, Tokyo (JP); Lining Yao, Cambridge, MA (US); Jifei Ou, Cambridge, MA (US); Sean Follmer, Somerville, MA (US); Hiroshi Ishii, Cambridge, MA (US)

(72) Inventors: Ryuma Niiyama, Tokyo (JP); Lining Yao, Cambridge, MA (US); Jifei Ou, Cambridge, MA (US); Sean Follmer, Somerville, MA (US); Hiroshi Ishii, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 637 days.

(21) Appl. No.: 14/257,900

(22) Filed: Apr. 21, 2014

(65) Prior Publication Data
US 2014/0314976 A1   Oct. 23, 2014

Related U.S. Application Data
(60) Provisional application No. 61/814,107, filed on Apr. 19, 2013.

(51) Int. Cl.
*F15B 7/06* (2006.01)
*F15B 15/10* (2006.01)
(Continued)

(52) U.S. Cl.
CPC ............ *F15B 15/103* (2013.01); *G06F 3/016* (2013.01); *G06F 3/0488* (2013.01);
(Continued)

(58) Field of Classification Search
CPC ......... F03G 7/06; E04F 15/107; F15B 15/103
(Continued)

(56) References Cited

U.S. PATENT DOCUMENTS 4,507,116 A * 3/1985 Leibinsohn ......... A61M 5/1483
                                                128/DIG. 12
5,568,957 A * 10/1996 Haugs ..................... B25J 15/12
                                                294/119.3
(Continued)

FOREIGN PATENT DOCUMENTS

WO   2012148472 A2   11/2012
WO   2014015146 A2   1/2014

OTHER PUBLICATIONS

Ou, Jifei et al., "jamSheets: Thin Interfaces with Tunable Stiffness Enabled by Layer Jamming", presented at TEI'14, Feb. 16-19, Munich, Germany. (obtained from <URL: http://tangible.media.mit.edu/project/jamsheets/> on Feb. 3, 2017).*
(Continued)

*Primary Examiner* — Edelmira Bosques
*Assistant Examiner* — Richard Drake
(74) *Attorney, Agent, or Firm* — Stephen R. Otis

(57) ABSTRACT

In exemplary implementations of this invention, a shape controller controls the shape of a bladder as the bladder inflates. The shape controller includes a first set of regions and a second set of regions. The second set of regions is more flexible than the first set of regions. The shape controller is embedded within, or adjacent to, a wall of the bladder. When the bladder is inflated, the overall shape of the bladder bends in areas adjacent to the more flexible regions of the shape controller. For example, the shape controller may comprise paper and the more flexible regions may comprise creases in the paper. Or, for example, the more flexible regions may comprise notches or indentations. In some implementations of this invention, a multi-state
(Continued)

shape display changes shape as it inflates, with additional bumps forming as pressure in the display increases.

1 Claim, 25 Drawing Sheets

(51) Int. Cl.
G06F 3/0488 (2013.01)
G06F 3/01 (2006.01)
H04M 1/02 (2006.01)

(52) U.S. Cl.
CPC ..... H04M 1/0202 (2013.01); *Y10T 428/1307* (2015.01); *Y10T 428/1334* (2015.01)

(58) Field of Classification Search
USPC .................................. 60/327, 430, 527; 92/6
See application file for complete search history.

(56) References Cited

U.S. PATENT DOCUMENTS

| 5,738,657 | A | * | 4/1998 | Bryant | B01J 7/02 |
| | | | | | 222/95 |
| 5,833,291 | A | * | 11/1998 | Haugs | A61G 7/001 |
| | | | | | 294/119.3 |
| 6,718,766 | B2 | * | 4/2004 | Seto | B25J 9/142 |
| | | | | | 60/476 |
| 7,258,379 | B2 | * | 8/2007 | Ono | B25J 9/142 |
| | | | | | 294/119.3 |
| 7,331,273 | B2 | | 2/2008 | Kerekes et al. | |
| 7,422,109 | B2 | * | 9/2008 | Yoshifusa | B65D 81/052 |
| | | | | | 206/522 |
| 8,154,527 | B2 | | 4/2012 | Ciesla et al. | |
| 8,179,375 | B2 | | 5/2012 | Ciesla et al. | |
| 8,179,377 | B2 | | 5/2012 | Ciesla et al. | |
| 8,199,124 | B2 | | 6/2012 | Ciesla et al. | |
| 9,448,066 | B2 | * | 9/2016 | Follmer | G01B 21/00 |
| 9,464,642 | B2 | * | 10/2016 | Ilievski | B25J 9/1075 |
| 2009/0051205 | A1 | | 2/2009 | Zheng | |
| 2010/0217436 | A1 | * | 8/2010 | Jones | B25J 5/005 |
| | | | | | 700/245 |
| 2012/0105333 | A1 | | 5/2012 | Maschmeyer et al. | |
| 2012/0280421 | A1 | * | 11/2012 | Keating | A63C 19/04 |
| | | | | | 264/227 |
| 2015/0107233 | A1 | * | 4/2015 | Ou | F15B 15/10 |
| | | | | | 60/327 |
| 2015/0141756 | A1 | * | 5/2015 | Cheng | A61B 1/00078 |
| | | | | | 600/146 |
| 2015/0217457 | A1 | * | 8/2015 | Lipson | B25J 15/0023 |
| | | | | | 294/86.4 |
| 2016/0231833 | A1 | * | 8/2016 | Gu | G06F 3/03545 |
| 2017/0131770 | A1 | * | 5/2017 | Keller | G06F 3/014 |

OTHER PUBLICATIONS

Martinez, R., et al., 2012, Elastomeric Origami: Programmable Paper-Elastomer Composites as Pneumatic Actuators. Advanced Functional Materials, vol. 22, Issue 7, pp. 1376-1384, Apr. 10, 2012.
Park, Y., et al., 2012, Design and Fabrication of Soft Artificial Skin Using Embedded Microchannels and Liquid Conductors. Sensors Journal, IEEE, vol. 12, Issue 8, pp. 2711-2718, Aug. 2012.
Perovich, L., et al., 2014, Awakened apparel: embedded soft actuators for expressive fashion and functional garments. Proceedings of the 8th International Conference on Tangible, Embedded and Embodied Interaction, TEI '14, pp. 77-80, Feb. 2014.
Shepherd, R., et al., 2011, Multigait soft robot. Proceedings of the National Academy of Sciences of the United States of America (PNAS), doi: 10.1073/pnas.1116564108.

* cited by examiner

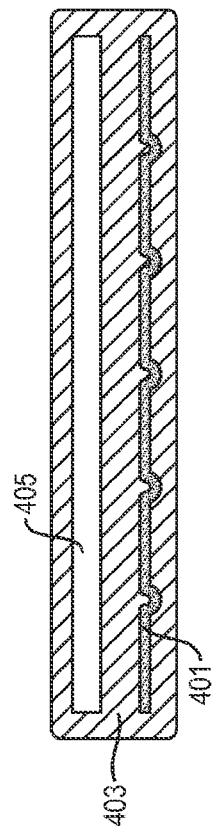
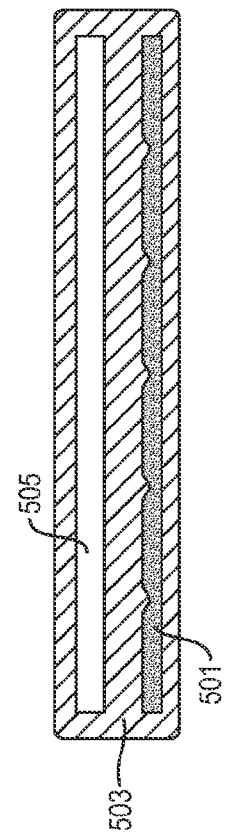
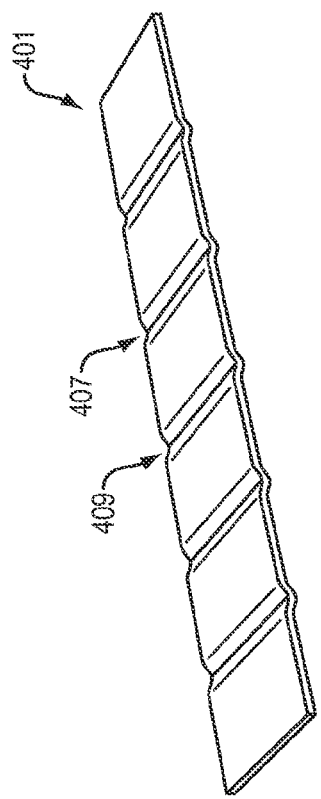
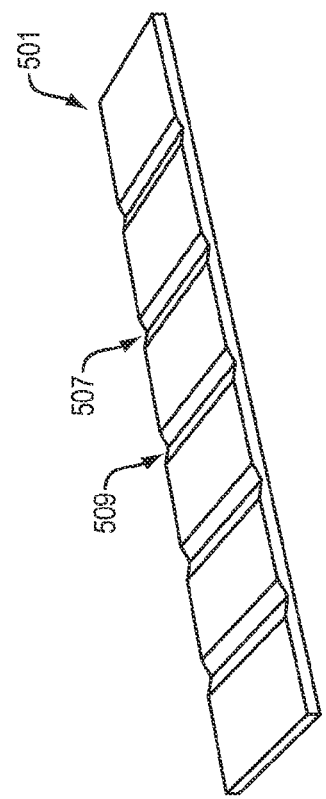
FIG. 4B  FIG. 5B
FIG. 4A  FIG. 5A

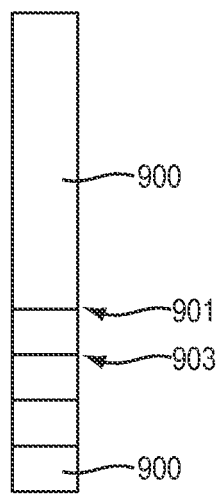
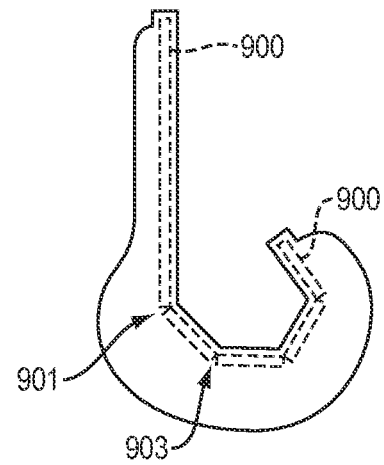
FIG. 9A    FIG. 9B
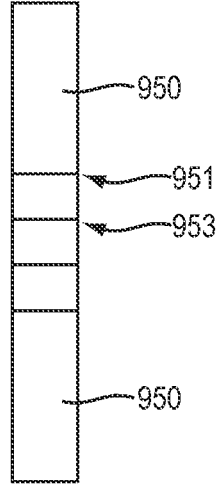
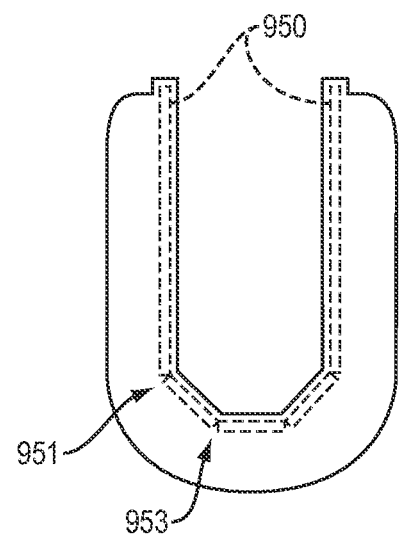
FIG. 9C    FIG. 9D

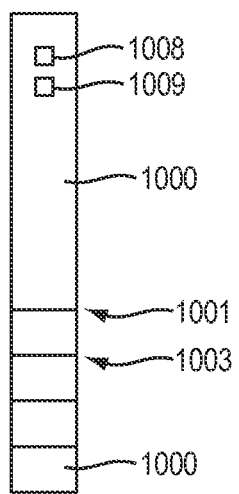
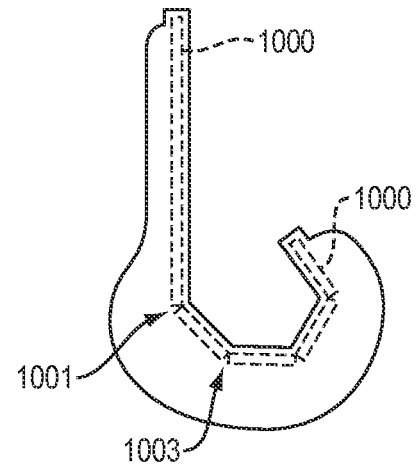
FIG. 10A
FIG. 10B
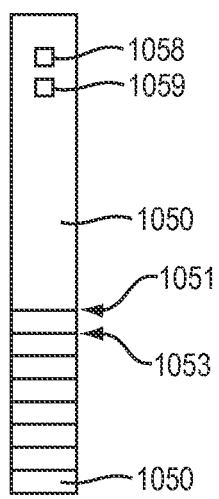
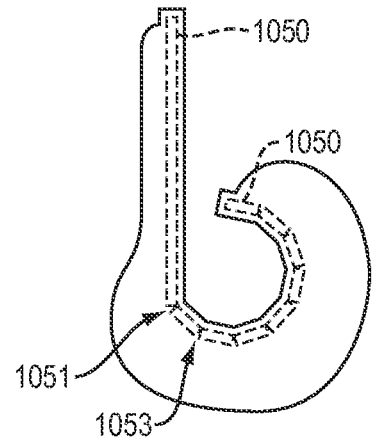
FIG. 10C
FIG. 10D

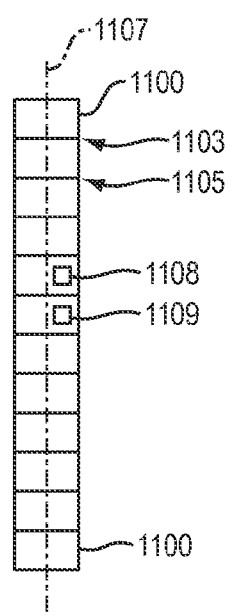
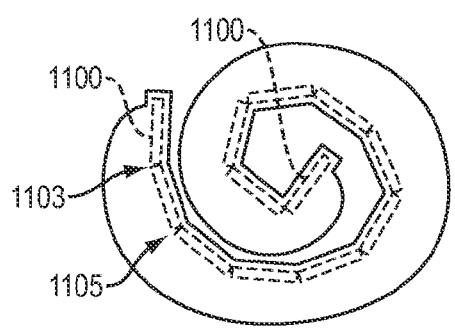
FIG. 11A  FIG. 11B
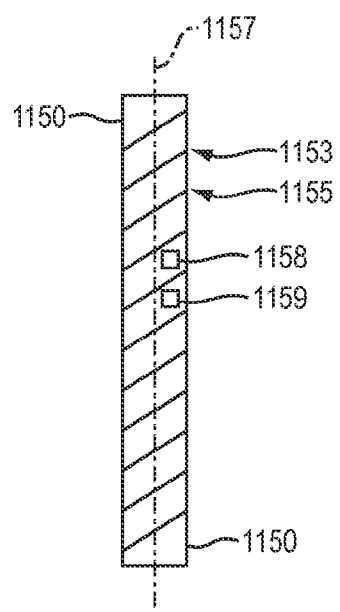
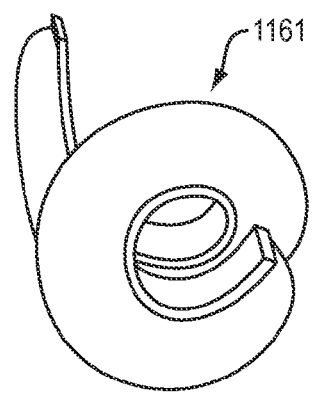
FIG. 11C  FIG. 11D

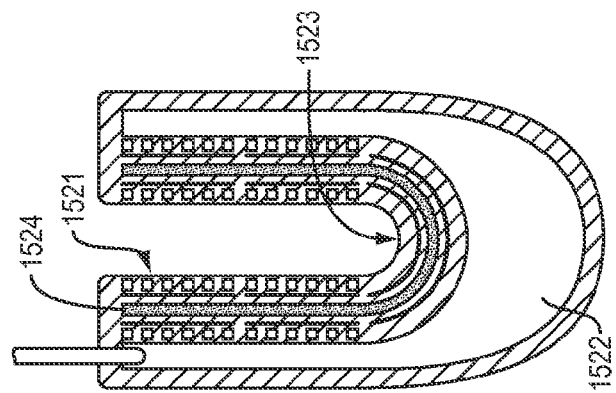
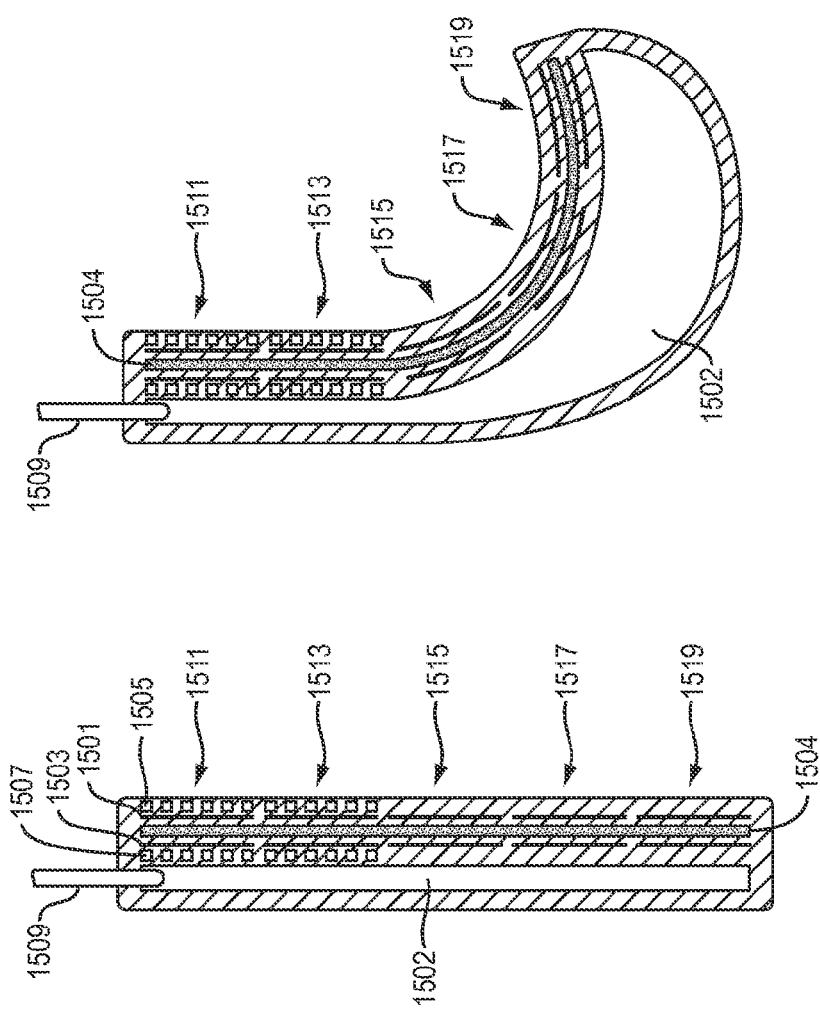
FIG. 15C
FIG. 15B
FIG. 15A

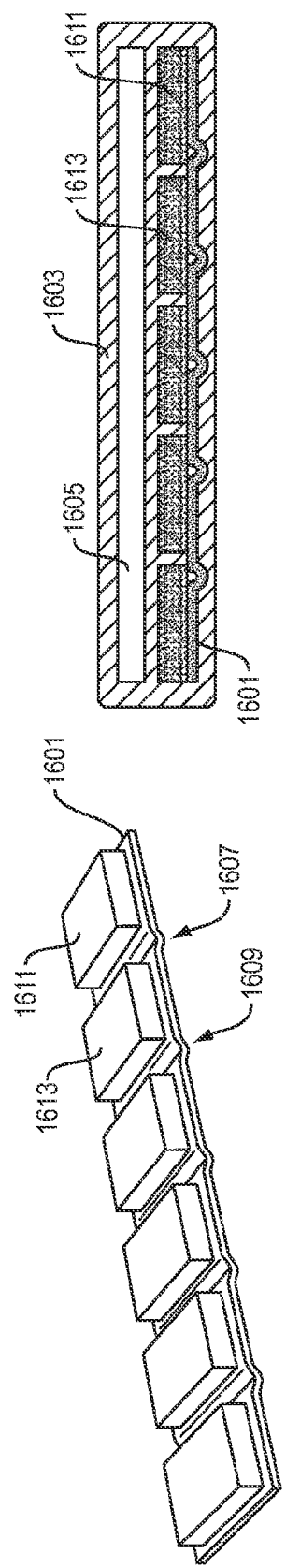

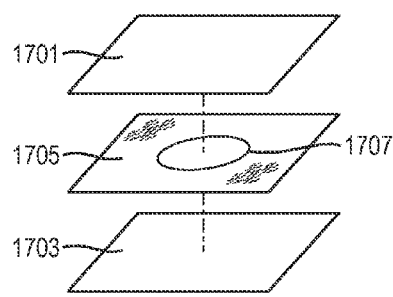
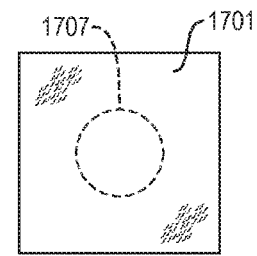
FIG. 17A
FIG. 17B
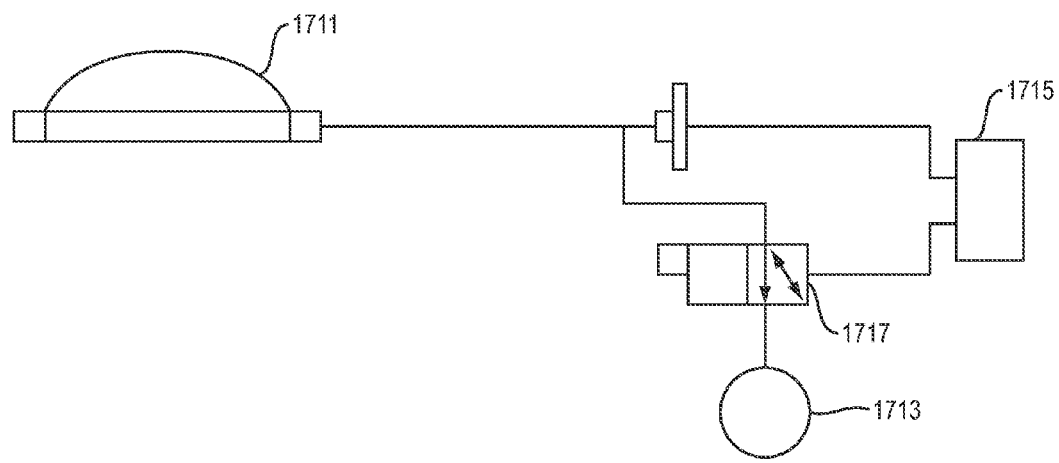
FIG. 17C
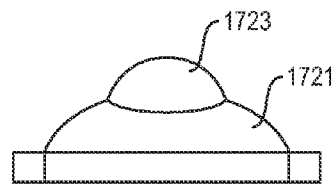
FIG. 17D

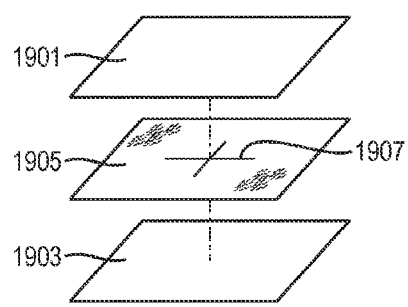
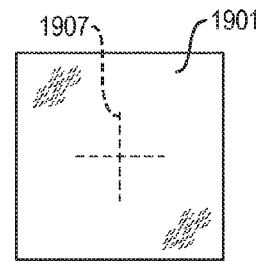
FIG. 19A          FIG. 19B
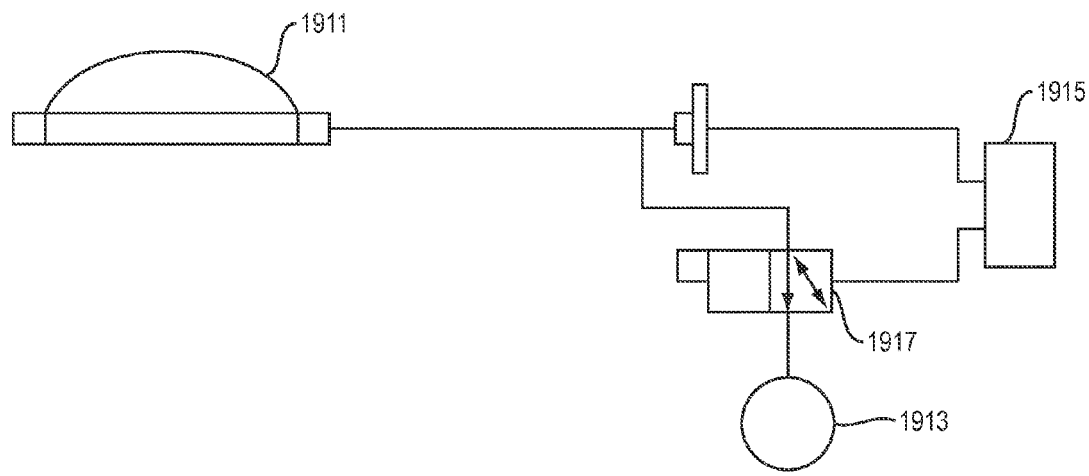
FIG. 19C
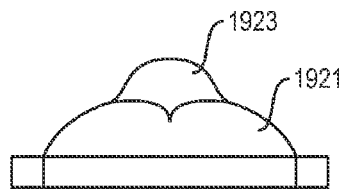
FIG. 19D

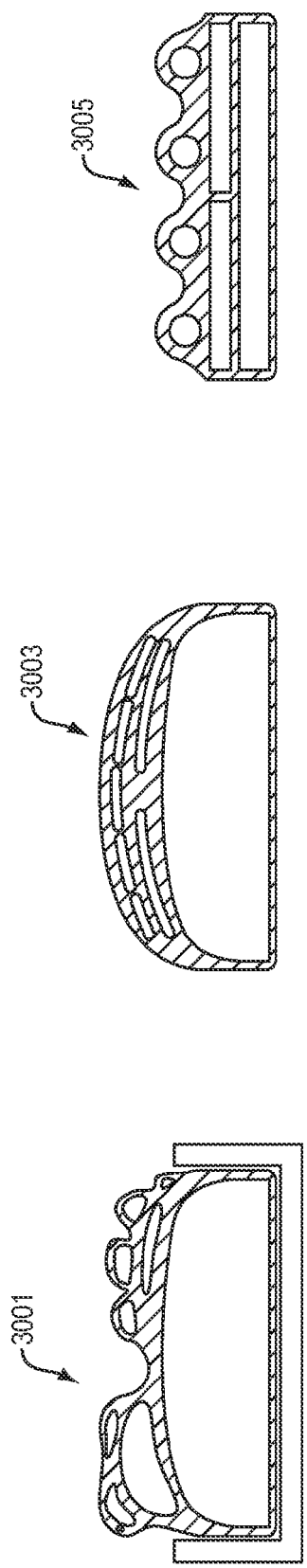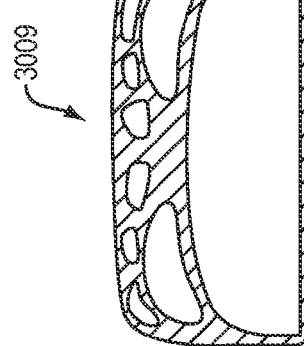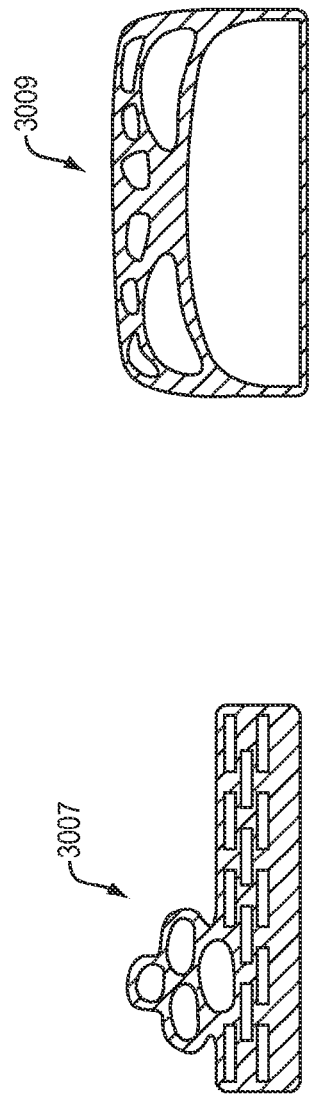
FIG. 30C
FIG. 30E
FIG. 30B
FIG. 30D
FIG. 30A

METHODS AND APPARATUS FOR SHAPE CONTROL

RELATED APPLICATIONS

This application is a non-provisional of, and claims the benefit of the filing date of, U.S. Provisional Application No. 61/814,107, filed Apr. 19, 2013, the entire disclosure of which is herein incorporated by reference.

FIELD OF THE TECHNOLOGY

This invention relates generally to shape control, including controlling shape of an inflatable object.

SUMMARY

In exemplary implementations of this invention, a shape controller controls the shape of a bladder as the bladder inflates. The shape controller includes a first set of regions and a second set of regions. The second set of regions is more flexible than the first set of regions. The first set of regions may have a first range of magnitudes of flexural strength and the second set of regions may have a second range of magnitudes of flexural strength, such that the first and second ranges do not overlap and each magnitude in the first range is greater than each magnitude in the second range.

The shape controller is embedded within, or adjacent to, a wall of the bladder. When the bladder is inflated, the overall shape of the bladder bends in areas adjacent to the more flexible regions of the shape controller—i.e., adjacent to the locations of the second set of regions. The bending and the inflation are actuated by internal fluidic pressure (e.g., air pressure or liquid pressure) pressing against a wall or walls of the bladder.

In some implementations, the shape controller comprises paper and the more flexible regions comprise creases in the paper.

In some implementations, the more flexible regions comprise notches or indentations. For example, the shape controller may comprise wood or plastic, and the notches or indentations may be cut or engraved by a laser cutter.

In some implementations, the less flexible regions of the shape controller comprise chambers filled with fluid (e.g., filled with air or liquid). These chambers may be less compressible than the more flexible regions of the shape controller. When the main bladder of the apparatus inflates, the overall shape of the main bladder may bend at locations between the fluid-filled chambers of the shape controller.

In some implementations, the less flexible regions of the shape controller may comprise inflatable chambers filled with fluid (e.g., filled with air or liquid).

If the shape controller includes fluid-filled chambers, then the more flexible portion of the shape controller: (a) may comprise a material separate from the wall in which the shape controller is embedded, or (b) may instead comprise subregions of the wall, each respective subregion being spatially between a pair of the chambers.

The location of the more flexible regions of the shape controller may determine the location of bends in the overall shape of an inflated bladder. Also, the density (or spatial frequency) of the more flexible regions of the shape controller may determine the smoothness of the curve of an inflated bladder.

In illustrative implementations of this invention: (a) the shape controller and bladder are each elongated and aligned with each other; and (b) each respective flexible region in the shape controller is elongated and has an orientation along its respective length. For example, a crease or notch in the shape controller may be in the overall shape of a line (when described in only one dimension), and have an orientation along the line. In these illustrative implementations, the flexible regions may be oriented perpendicular to the longitudinal axis of the shape controller, which may cause the bladder, when it inflates, to morph into the shape of a planar spiral. Alternatively, the flexible regions may be oriented at an angle that is not perpendicular to the longitudinal axis of the shape controller, which may cause the bladder, when it inflates, to morph into the shape of a helix.

In some implementations, a shape controller may contain a jammable material, such as granular particles, that becomes rigid when compressed. One or more pumps and valves may be used to adjust pressure inside the shape controller to reversibly jam and unjam the jammable material. When jammed, the shape control is rigid. When unjammed, the shape controller is flexible.

In some implementations of this invention, a multi-state shape display changes shape as it inflates, with the number of bumps that are formed increasing as pressure in the display increases.

For example, the surface may comprise a "sandwich" of three elastic layers. The middle layer of the "sandwich" may be stiffer than the inner and outer layers of the "sandwich". For example, the middle layer may be stiffer due to having a larger Young's modulus than the inner and outer layers, or due to being thicker than the inner and outer layers, or due to otherwise having a different stress-stain curve than the inner and outer layers.

As the display inflates, it may go through different stages of inflation. During an initial stage of inflation of the multi-state shape display, the inflation may be relatively isotropic (uniform in all directions). During a later stage of the inflation, the inflation may be anisotropic (not uniform in all directions). For example, during a later stage of inflation, additional bumps may form on the surface of the display.

Holes may be cut in the middle, stiffer layer. As pressure in the display increases, the inner and outer layers may undergo greater strain than the middle layer, causing additional bumps to form on the surface of the multi-state shape display. These additional bumps form at locations of the surface where the holes in the middle, stiffer layer exist. Different shaped holed (e.g., circular, triangular or cross-shaped) cause different shaped bumps.

Alternatively, the middle layer may comprise a structure with gaps in it (e.g., a woven structure with gaps in it, or a set of parallel strips with gaps between them). In this case, the additional bumps may form at the locations of the gaps in the middle layer.

Alternatively, the surface of a multi-state shape display may comprise more than three layers, at least some of which have different stiffnesses. For example, the surface may comprise a "sandwich" of four elastic layers. A first central layer of the "sandwich" may be stiffer than a second central layer of the "sandwich", and both central layers may be stiffer than the inner and outer layers of the "sandwich". Holes in the second central layer may be surrounded by holes in the first central layer (when viewed from a perspective normal to the central layers). This four-layer "sandwich" can produce at least three levels of bumps. For example, during an initial stage of inflation of the multi-state inflatable device, the overall shape of the display may have only a single bump. In a later stage of inflation, a second level of bumps may form on the initial single bump. During an even later stage of inflation, a third level of bumps may form on the second level of bumps.

The multi-state inflatable display may be inflated by increasing the pressure of a fluid (e.g., air or liquid) contained in a bladder of the display.

An elastic wall of a bladder may comprise an elastomer. A bladder may contain a fluid (e.g., air or liquid). One or more pumps, one or more valves, and tubing connecting the bladder, pumps and valves, may be used to control the pressure within a bladder, and thus to control the inflation or deflation state of the bladder. One or more computer processors may be used to control the pumps and valves. In implementations with multiple bladders, pressure in each bladder may be separately controlled. Or, alternatively, the pressure in a group of bladders may be commonly controlled.

In some implementations of this invention, one or more processors control inflation and deflation of multiple bladders, in order to dynamically and programmatically alter the shape of a surface over time.

In some implementations of this invention, sensors detect human input to the shape display (e.g., a human touching the display surface, hovering near the display surface, or directly manipulating the shape of the surface) and detect shape output of the display (e.g., changes to surface morphology due to inflation or deflation of a bladder). For example, the sensors may be capacitive and may be embedded in, or mounted or housed adjacent to a shape controller, a bladder wall, or a surface of the shape display.

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

BRIEF DESCRIPTION OF THE DRAWINGS

FIG. 1A is a perspective view. FIG. 1B is a cross-sectional view, with the cross-section being along a plane that is normal to the longitudinal axis of the bladder. FIG. 1C is a cross-sectional view, with the cross-section being along a plane that is parallel to the longitudinal axis of the bladder.

In FIG. 2A, the bladder is not inflated. In FIG. 2B, the bladder is inflated.

FIGS. 4A, 5A, 6A and 7A each show a different type of device for controlling the shape of a bladder when the bladder inflates (a "shape controller").

FIGS. 4B, 5B, 6B and 7B each show a shape controller embedded within a wall of a bladder.

In FIGS. 4A and 4B, the shape controller comprises a paper layer with creases in it.

In FIGS. 5A and 5B, the shape controller comprises a solid material with indentations engraved in it.

In FIGS. 6A and 6B, the shape controller comprises a solid material with some regions that are thicker than other regions.

In FIGS. 7A and 7B, the shape controller comprises multiple components, with some components being stiffer than another component.

FIG. 8A shows a shape controller with a narrow angle notch in it. FIG. 8B shows this shape controller embedded within a wall of a bladder. FIG. 8C shows this bladder in an inflated state.

FIG. 8D shows a shape controller with a wide angle notch in it. FIG. 8E shows this shape controller embedded within a wall of a bladder. FIG. 8F shows this bladder in an inflated state.

FIGS. 9A, 9B, 9C, and 9D together illustrate how the locations of creases in a shape controller can determine where the bladder bends, when the bladder is inflated.

In FIG. 9A, the creases are located at four positions near an end of the shape controller. In FIG. 9B, an inflated bladder bends at these four positions.

In FIG. 9C, the creases are located at four other positions near the center of the shape controller. In FIG. 9D, an inflated bladder bends at these four other positions.

FIGS. 10A, 10B, 10C, and 10D together illustrate how the density (or spatial frequency) of creases in a shape controller can determine where the smoothness of curvature a bladder, when the bladder is inflated.

In FIG. 10A, four creases are located at four positions on a shape controller. In FIG. 10B, an inflated bladder bends at these four positions.

In FIG. 10C, eight creases are located at eight positions on a shape controller. In FIG. 10D, an inflated bladder bends at these eight positions, resulting in a smoother curve than the curve formed by only four creases.

FIGS. 11A, 11B, 11C, and 11D together illustrate how the angle of creases in a shape controller can determine whether the bladder forms a planar spiral or a helix, when the bladder is inflated.

In FIG. 11A, creases are oriented normal to the longitudinal axis of the shape controller. In FIG. 11B, these creases cause a bladder to form a planar spiral, when the bladder is inflated.

In FIG. 11C, creases are oriented at an angle, relative to the longitudinal axis of the shape controller, which is not equal to 90 degrees. In FIG. 11D, these creases cause a bladder to form a helix, when the bladder is inflated.

FIG. 12A is a cross-sectional view, with the cross-section being along a plane that is normal to the longitudinal axis of the bladder. FIG. 12B is a cross-sectional view, with the cross-section being along a plane that is parallel to the longitudinal axis of the bladder.

FIGS. 14A, 14B and 14C each show a bladder with jammable shape controllers embedded in a wall of the bladder. In FIG. 14A, the bladder is not inflated. In FIG. 14B, the bladder is inflated and three shape controllers are jammed. In FIG. 14C, the bladder is inflated and two shape controllers are jammed.

FIGS. 15A, 15B and 15C each show a bladder in which a shape controller includes a vessel filled with an addressable electrorheological fluid.

FIGS. 15A and 15B show a bladder with two sets of electrodes. In FIG. 15A, the bladder is deflated. In FIG. 15B, the bladder is inflated.

FIG. 15C shows a bladder with four sets of electrodes, where the bladder is inflated.

FIG. 16A shows a shape controller which includes capacitive sensors. FIG. 16B shows this shape controller, embedded in a wall of a bladder.

FIGS. 17A, 17B, 17C and 17D show a multi-state inflatable surface formed by three layers, in which the middle layer has a circular hole in it. FIG. 17A shows an exploded view of three layers in the surface. FIG. 17B shows a top view of the surface. FIG. 17C shows a system for inflating and deflating the surface. FIG. 17D shows the surface in a fully inflated state, with two layers of protuberances.

FIG. 18A shows an exploded view of three layers in the surface. FIG. 18B shows a top view of the surface. FIG. 18C shows a system for inflating and deflating the surface. FIG. 18D shows the surface in a fully inflated state, with two layers of protuberances.

FIGS. 19A, 19B, 19C and 19D show a multi-state inflatable surface formed by three layers, in which the middle layer has a cross-shaped hole in it. FIG. 19A shows an exploded view of three layers in the surface. FIG. 19B shows a top view of the surface. FIG. 19C shows a system for inflating and deflating the surface. FIG. 19D shows the surface in a fully inflated state, with two layers of protuberances.

FIG. 20A shows an exploded view of three layers in the surface. FIG. 20B shows a top view of the surface. FIG. 20C shows a system for inflating and deflating the surface. FIG. 20D shows the surface in a fully inflated state, with two layers of protuberances.

FIG. 21A shows an exploded view of three layers in the surface. FIG. 21B shows a top view of the surface. FIG. 21C shows a system for inflating and deflating the surface. FIG. 21D shows the surface in a fully inflated state, with two layers of protuberances.

FIG. 22A shows an exploded view of three layers in the surface. FIG. 22B shows a top view of the surface. FIG. 22C shows a system for inflating and deflating the surface. FIG. 22D shows the surface in a fully inflated state, with two layers of protuberances.

FIG. 23A shows an exploded view of four layers in the surface. FIG. 23B shows a top view of the surface. FIG. 23C shows a system for inflating and deflating the surface. FIG. 23D shows the surface in a more (but not fully) inflated state, with two levels of protuberances.

FIG. 24A shows an exploded view of four layers in the surface. FIG. 24B shows a top view of the surface. FIG. 24C shows a system for inflating and deflating the surface. FIG. 24D shows the surface in a more (but not fully) inflated state, with two levels of protuberances.

FIG. 25A shows an exploded view of four layers in the surface. FIG. 25B shows a top view of the surface. FIG. 25C shows a system for inflating and deflating the surface. FIG. 25D shows the surface in a more (but not fully) inflated state, with two levels of protuberances.

FIG. 26A shows an exploded view of four layers in the surface. FIG. 26B shows a top view of the surface. FIG. 26C shows a system for inflating and deflating the surface. FIG. 26D shows the surface in a more (but not fully) inflated state, with two layers of protuberances.

FIG. 27 shows a perspective view of the shape display.

FIG. 28A shows a shape display with a set of embedded bladders for controlling the shape of a surface of the display.

FIG. 28B shows a shape display with a different set of embedded bladders for controlling the shape of a surface of the display.

FIGS. 29A, 29B and 29C show examples of ways in which bladders in a display can be controlled. In FIG. 29A, each bladder is separately controlled. In FIG. 29B, a set of three bladders shares a common control. In FIG. 29C, some bladders are controlled via horizontal control lines, and other bladders are controlled via vertical control lines.

FIGS. 30A, 30B, 30C, 30D and 30D show an addressable, dynamic shape display, displaying different shapes. In FIG. 30A, the display surface has multiple protuberances. In FIG. 30B, the display surface is a smooth curve. In FIG. 30C, the display surface is a sinusoidal in shape. In FIG. 30D, the display surface has a "gnarly" protuberance. In FIG. 30E, the display surface is flat.

Figure 1A:
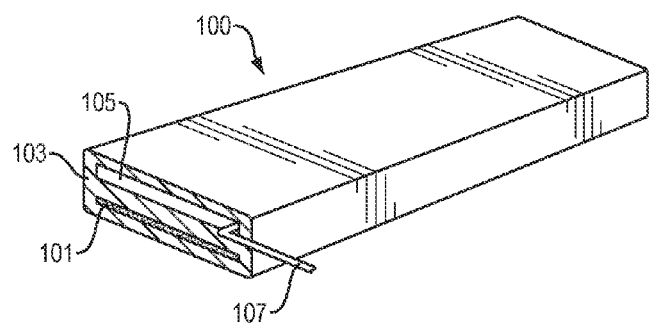
FIGS. 1A, 1B, and 1C show views of an elongated bladder.

The above Figures show some illustrative implementations of this invention, or provide information that relates to those implementations. However, this invention may be implemented in many other ways. The above Figures do not show all of the details of this invention.

DETAILED DESCRIPTION

In exemplary implementations of this invention, a soft composite material undergoes controlled changes in shape. The shape output is computationally controllable through fluidic pressure and pre-defined structure. The material undergoes isotropic (uniform in all orientations) or anisotropic (directionally dependent) deformation. Optionally, the material is capable of input sensing and active shape output Shape change, both at the macro and micro level, can be used to convey information to users as a type of display. Either shape states or change in shape state may convey information. For example, texture (or change in texture) can provide a haptic channel for representing or communicating information. A soft composite material can display dynamically controllable shape patterns that can vary in density, frequency and sequence.

In exemplary implementations of this invention, a soft composite material undergoes isotropic and anisotropic deformation in response to fluidic pressure (e.g., air pressure or liquid pressure). The composite material may comprise multiple layers, including two or more structural layers and (optionally) a sensing layer and an add-on layer.

A structural layer (Structural Layer 1) may comprise an elastomeric polymer (or elastomer) to enable isotropic shape deformation. For example, the elastomer may comprise rubber. Structural Layer 1 may have bladders and fluidic channels embedded within it.

An additional structural layer (Structural Layer II) may include a range of materials with different elasticity to create constrained anisotropic deformation in response to fluidic pressure. For example, Structural Layer II may have an origami structure, a woven structure, a crease pattern, fluid-filled bladders or a cutout pattern of holes.

Optionally, conductive materials, either solid or liquid, such as conductive thread and liquid metal, are composited as a Sensing Layer to sense input or output. For example, the conductive material may comprise liquid metal, conductive thread, conductive fabric, conductive ink, metal sheet or metal wire. Also, for example, a pattern of conductive material may be laid out on a substrate, positioned within channels, or printed.

Optionally, an add-on layer can be composited to control material properties other than active shape output. For example: (a) jamming particles can control surface stiffness to give haptic affordances or lock shapes in a certain state; and (b) thermochromic liquid crystals can be injected into air channels of elastomer to change the color of surfaces.

Each layer of the soft composite may include one or more components with their own structures. These structures can enhance or modify the deformations caused by pressure-actuated inflation. For example, copy paper itself has relatively low elasticity, however, origami structure enables increased flexibility in a specific directions.

In exemplary implementations of this invention, change in curvature, volume and texture of a composite material provide a range of deformation behaviors and thus enable or enhance shape changing interfaces on both the macro and micro level. Controlled compression and elongation generate curvatures at given points of a surface. For example, crease patterns on a paper layer or the location of bladders can define the position of the deformation. Air pressure can determine the degree of curvature.

In some implementations, the composite material includes three layers: a silicon layer with embedded bladders connected with channels, a paper layer with crease patterns, and a thin silicon layer at the bottom to bond and protect the paper layer. Surface curvature may be controlled by the compression of bladders with low elasticity, or the elongation of airbags with high elasticity.

In some implementations, a paper composite with various crease patterns is used to control bending behavior. When inflated, the inner bladders function as actuators to generate elongation and force the surface to bend towards the opposite direction.

In some implementations, the composite material is fabricated as follows: A pre-mixture of silicon (EcoFlex® 00-30) is poured into a 3D printed mold designed to form a shape with air channels. Creased paper is soaked into the same silicon mixture. Silicon and paper layer are peeled off molds separately once thermally cured. Two layers are then bonded with uncured silicon.

In some implementations of this invention, dynamic control of the curvature is determined by two factors: fluidic pressure and crease pattern. First, fluidic pressure can control the degree of curvature. For example, pumping additional air into a bladder can cause a single bend to turn into a curl with continuous bending. Second, the paper crease patterns may affect the deformation. For example, three factors of crease patterns may be varied: density, location and angle. Density of creases affects the sharpness of bending. Low density creases enable sharper bends. By varying the location of crease, bending location on the surface can be controlled. Laying out the crease lines diagonally generates helical shapes instead of curling in a single plane.

For example, specific crease patterns and control of fluidic pressure in bladders can, among other things: (a) make a flat circular shape morph into different spatial structures with three stands ("legs"), or (b) cause a progressive transformation from a line to a square.

Alternatively, instead of creases in paper, notches cut in thin pieces of wood may be used to produce similar bending and curling behaviors.

In some implementations of this invention, compression of nonelastic bladders is used to help control shape. For example, a composite material may include two layers: a plain paper layer and plastic airbags with low elasticity. The airbags may be fabricated using plastic welding and glued with the paper layer. While inflated, a nonelastic airbag may behave like a biceps, and compress as the surface bends. In this case, the inflation of nonelastic airbags may occur on the side towards which the surface bends.

In some implementations of this invention, origami structures are composited with elastomers. For example, a hollow accordion-like structure, with origami folded surfaces on its sides, can inflate or deflate in response to changes in fluidic pressure inside the structure.

For example, an origami folded surface that forms a side of such a hollow structure may be coated on both side with a soft silicon, as follows: The origami can be spin coated and sealed with silicon (EcoFlex® 00-30). In this case silicon serves three functions: sealing the origami structure for air actuation, coating the paper surface for enhancing material durability, and constraining elasticity of origami structure within a specific range.

For example, volume change of the hollow structure (with silicon-coated origami walls) can be actuated by air transported into the hollow space. Direct manipulation can also deform the shape.

A hollow structure with composite origami walls may undergo a variety of volume changing behavior, including linear elongation, angular expansion and rotatory elongation. For example, an accordion structure folded from V-pleats enables linear elongation. Angular expansion can be achieved by using the same pleating pattern and bonding one side of the folds with silicon. Rotatory elongation can be achieved with cylindrical structures folded with triangular pleats.

In some implementations of this invention, textures are formed on soft surfaces by fabricating bladders inside elastomer or compositing fabric with cut patterns. Conductive threads, such as plated silver type threads, can be embedded in the composite material for human touch and gesture sensing.

For example, embedded bladders may be arranged in columns, and each column of bladders can be inflated separately. The density, frequency and sequence of texture can be varied by pumping and vacuuming fluid in separate columns at different times. The combination of the three factors is capable of communicating different types of information, such as directional signals and speed. Also, by compositing a second silicon layer with bigger bladders, deformation on both macro and micro level can be achieved, to create texture patterns on a deformable, 3D surface.

Another approach to generate texture on soft surfaces is to combine (1) an elastic material (e.g., an elastic fabric such as Spandex®) with cut patterns in it, and (2) a less elastic material, such as silicon. This can create multi-state deformation, where a soft surface has only one protuberance at one internal pressure, but multiple protuberances at a higher internal pressure.

In some implementations of this invention, (a) electrodes embedded in a composite material sense large-scale changes in shape, or (b) fluid conductors embedded in a composite material sense local surface deformation with high sensitivities. The cause of shape deformation can be internal fluidic pressure or human gestures.

Flexible circuitry (e.g., cut out of copper tape or printed by an inkjet printer with conductive ink) can be included as a sensing layer in the soft composite material. For example, electrode patterns can sense direct touch and near range proximity by measuring the capacitance between human fingers and the electrode network. A coating of silicon layer on top of the sensing pads enables insulation. Multilayer circuitry can be composited between silicon layers. In some cases, rigid electrical components, such as surface mounted LEDs, are embedded within soft elastic walls.

In an illustrative implementation, in which origami is used as a supporting and constraining structure, electrodes made from copper tape can be composited with paper folds to sense structural deformations. These deformations can be caused by either pressure actuation or direct manipulation. The separation distance between folds correlates to the capacitance between the electrodes. For a linear accordion, multiple (e.g., four) electrode pairs on two sides of the structure can be sufficient to measure the height of each side. Other electrode placements can be extended to sense additional geometrical folding structures. For example, some electrode pairs can sense changes in height, others can sense side bending, and others can sense diagonal bending.

In some implementations, capacitive sensor measurements with these electrodes are taken by stimulating one electrode with a square wave and then reading the induced voltage on the adjacent electrodes. Readings are taken at time T after the rising and falling edges of the square wave, and the difference between these measurements is averaged for 23 cycles. Because the time constant of an RC circuit is dependent on C (capacitance), as C changes, the voltage at time T changes, allowing for relative changes in capacitance to be measured. Sensor data for each side is averaged and then passed through a windowed time average in order to eliminate noise. The value for each side is then unity-normalized to determine the relative height of each side.

In some implementations, conductive liquid metal (e.g., eGaIn) is injected into inner channels of elastomer to form an elastic sensing surface. The resistance of liquid metal changes in response to the deformation of the channels (e.g., deformation due to inflation from pressure within a bladder, or due to direct manipulation by a human user).

In some implementations, embedded sensors can detect human input (e.g., gestures on the surface, gestures hovering over the surface, or gestures that deform the surface) or shape output (e.g., shape changes due to changes in internal pressure). Advantageously, a soft interface can undergo a wide variety of manipulations by a human to deform its surface, such as pushing, stretching, bending, embracing, stroking and squeezing.

In exemplary implementations of this invention, a fluidic (e.g., pneumatic) control system actuates the soft composite material. Air can be either injected into air channels inside elastomer, or introduced into a cavity surrounded by the composite material. In some cases, the control system can operate in three modes to control the flow of fluid (e.g., air or liquid) in and out of the soft composite material: supply, exhaust, and close. The supply and exhaust are modes to inflate/deflate a bladder. The close mode stops the fluid flow in or out of the cavity in the composite.

For example, a fluidic control system may comprise two 3-port solenoid valves, an air compressor, and a vacuum pump for a single air bag. For example, a large-sized stationary air compressor and a vacuum pump may be used for stationary applications. Or, for example, a miniature fluidic control system may be used for mobile applications. Such a miniature system may employ small solenoid valves, a pump used for both supply and vacuum, and a lithium polymer battery (3.7V, 110 mAh).

This invention has many practical applications. Here are four non-limiting examples:

First, this invention may be implemented as a shape changing mobile phone. The shape changing mobile phone has a flexible body that enables multiple bending states, to give users dynamic affordances for various use cases. The surface can animate between flat and bending state when a call comes in. It can morph from a bar shape to a curved phone shape if a user answers the phone call. When placed over the user's arm, it can turn into a wearable wristband.

Second, this invention may be implemented as a transformable tablet case. Larger bladders can be inflated as grippers for a car racing game controller, and columns of smaller bladders on top can be inflated sequentially. The tablet can demonstrate the hybrid of macro and micro level shape change, based on the isotropic deformation behavior exhibited by homogeneous elastomer. A flexible texture layer can be molded on top of the bigger bladders. Multistage molding and casting may be used to fabricate the tablet case. To keep the tablet case thin and light, two flat Mylar pieces may be embedded during the casting process, to create two flat yet inflatable bladders below finer texture bubbles.

Third, this invention may be implemented as a shape-shifting lamp. This lamp can undergo a large deformation from a straight strip shape to a rounded bulb shape. A human user can pull the strip, similar to pulling the chain of a conventional lamp. The strip is the illuminating light itself and starts to curl and light up. Silicon with embedded liquid metal is fabricated as pulling sensor, which is attached to the top of the lamp strip. Surface mounted LEDs are soldered on top of flexible copper strips. The copper strips are bonded with a paper substrate with angular cut patterns. The two layers, paper layer and air channel layer, are bonded together with half cured silicon.

In some implementations of this invention, a shape display interface can be dynamically and programmatically controlled in real time.

In some implementations, memory alloy or heat reactive polymers are embedded, and two actuation sources (fluidic pressure and heat respectively), are used for flexible control of shape changing states.

In some implementations, chemical reactions that generate gas sources eliminate or reduce the need for hardware for fluidic (e.g., pneumatic) control systems.

In some implementations, topological change, including creating holes on surfaces, can give interesting affordances for interaction. Further, locomotion can be achieved with programmable constraints in the material structure. Shape locking may be implemented with solenoid switches. Alternatively, stiffness changing materials, such as jamming particles, can be used to lock shapes or introduce dynamic constraints.

Elastic polymer in the composite materials can be 3D printed. For example, 3D printing can facilitate construction of complex air channels.

Figure 1B:
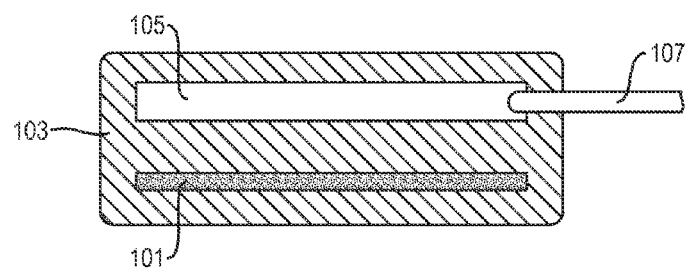
Figure 1C:
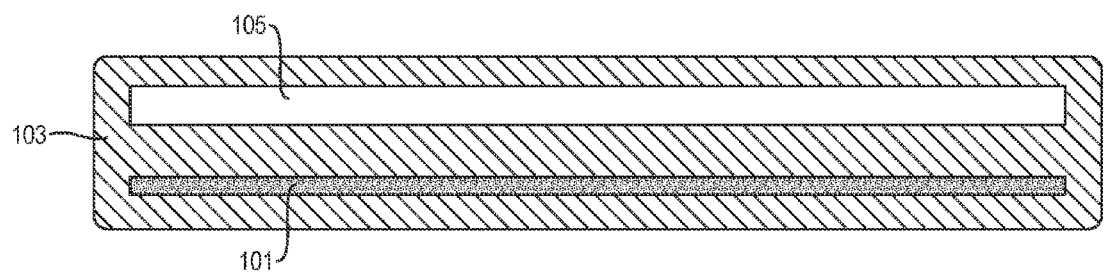

FIGS. 1A, 1B, and 1C show views of an elongated bladder. FIG. 1A is a perspective view. FIG. 1B is a "front" cross-sectional view, with the cross-section being along a plane that is normal to the longitudinal axis of the bladder. FIG. 1C is a "side" cross-sectional view, with the cross-section being along a plane that is parallel to the longitudinal axis of the bladder.

In the example shown in FIGS. 1A, 1B, and 1C, an elongated bladder 100 comprises an elastic wall 103 which encloses a cavity 105. The cavity 105 contains a fluid, such as air or a liquid. A device for controlling the shape of the bladder when the bladder inflates (a "shape controller") 101 is embedded in the elastic wall 103. For example, the wall 103 may comprise an elastomer. The pressure of the fluid in the cavity 105 may be controlled through a port 107 that connects to apparatus for inflating or deflating the bladder. For example, port 107 may comprise a tube that penetrates the wall 103 of the cavity.

Figure 2A:
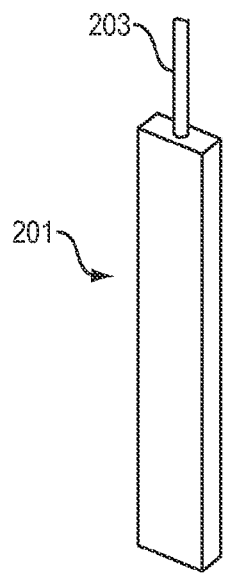
FIGS. 2A and 2B are perspective views of an elongated bladder.
Figure 2B:
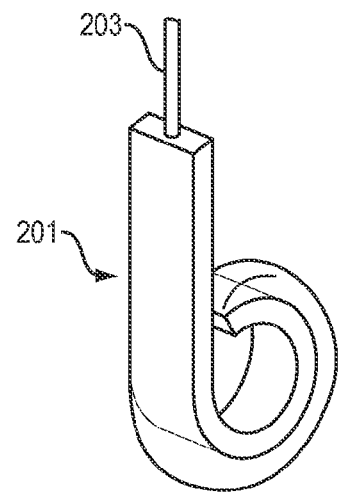

FIGS. 2A and 2B are perspective views of an elongated bladder. In FIG. 2A, the bladder 201 is not inflated. In FIG. 2B, the bladder 201 is inflated. A port 203 is used to control pressure within the bladder 201, and thus to control inflation and deflation of the bladder 201.

Figure 3:
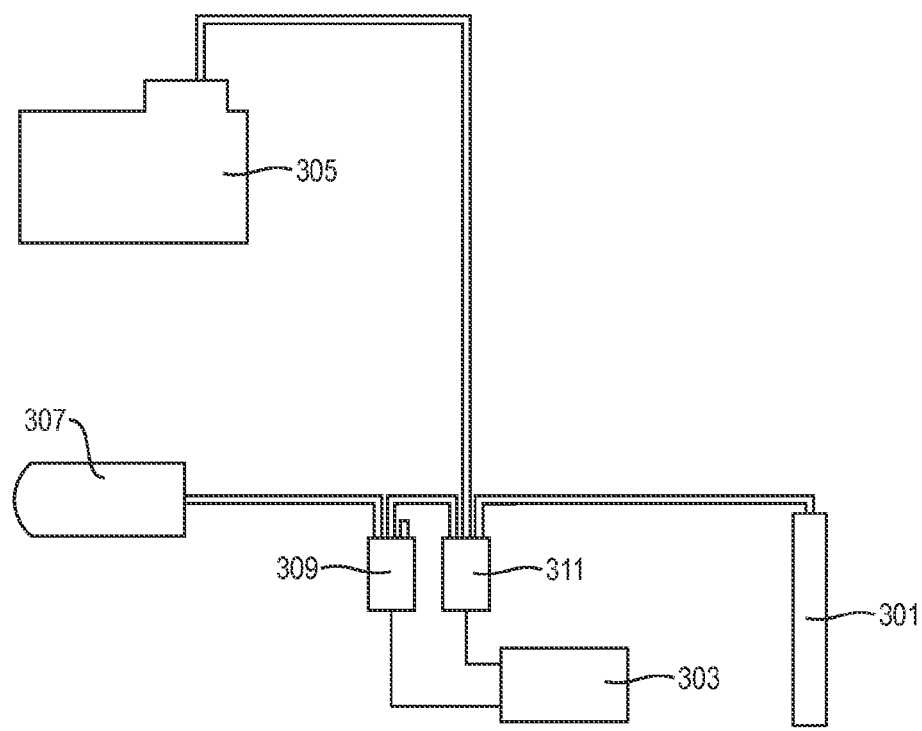
FIG. 3 shows a system comprising a bladder and apparatus for inflating and deflating the bladder.

FIG. 3 shows a system comprising a bladder 301 and apparatus for inflating and deflating the bladder. In the example shown in FIG. 3, one or more computer processors 303 control the operation of an air compressor 305, pump 307 and valves 309, 311, in order to control pressure of fluid within the bladder, and thus to control the inflation or deflation of the bladder 301. Optionally, the pump 307 may include a low pressure chamber. The low pressure in that chamber may be created by operation of the pump over a period of time. By opening a valve to the low-pressure chamber, pressure in the bladder 301 may be reduced more rapidly than by ordinary pumping.

FIGS. 4A, 5A, 6A and 7A each show a different type of device for controlling the shape of a bladder when the bladder inflates (a "shape controller").

FIGS. 4B, 5B, 6B and 7B each show a shape controller 401, 501, 601, 701 embedded within a wall 403, 503, 603, 703 of a bladder. The wall surrounds a cavity 405, 505, 605, 705.

In FIGS. 4A and 4B, the shape controller comprises a paper layer 401 with creases (e.g., 407, 409) in it. The creases are more flexible than the rest of the paper layer.

In FIGS. 5A and 5B, the shape controller comprises a solid material 501 with indentations (e.g., 507, 509) engraved in it. The indentations are more flexible than the rest of the solid material.

Figure 6B:
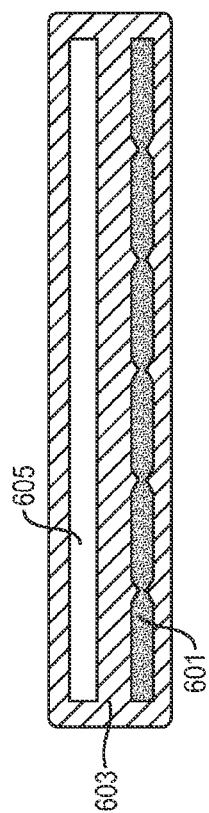
Figure 6A:
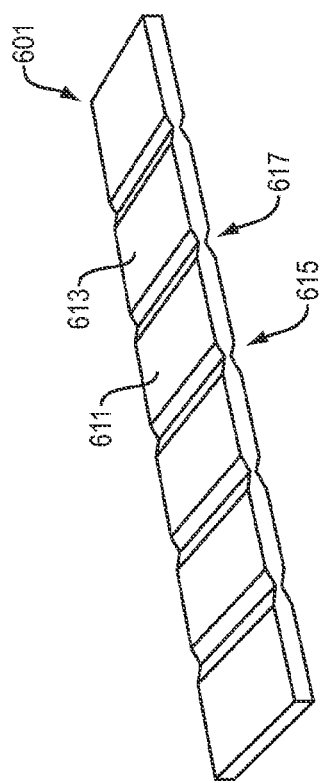

In FIGS. 6A and 6B, the shape controller comprises a solid material with some regions (e.g., 611, 613) that are thicker than other regions (e.g., 615, 617). The thicker regions 611, 613 are stiffer than the other regions (e.g., 611, 613) of the solid material.

Figure 7B:
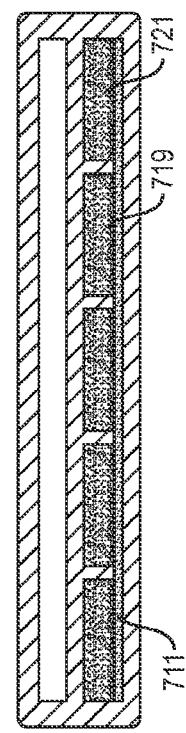
Figure 7A:
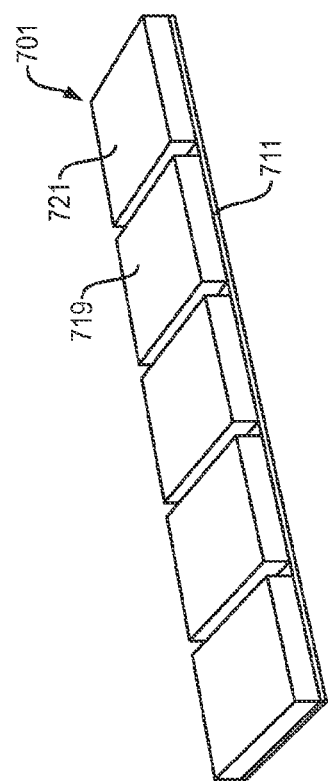

In FIGS. 7A and 7B, the shape controller comprises multiple components, with some components (e.g., 719, 721) being stiffer than another component 711. For example, the stiffer components (e.g., 719, 721) may be stiffer due to having a larger Young's modulus than the other component 711. Or, for example, the stiffer components (e.g., 719, 721) may be stiffer due to being thicker than the other component 711.

Figure 8A:
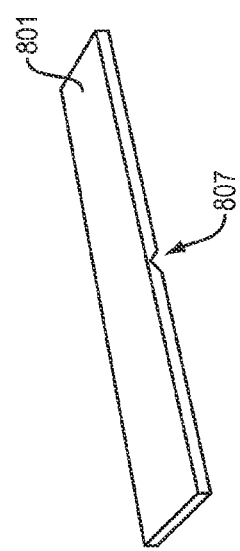
FIGS. 8A, 8B, 8C, 8D, 8E and 8F together illustrate how the angle of a notch in the surface of a shape controller can determine the angle of bending of the bladder, when the bladder is inflated.
Figure 8B:
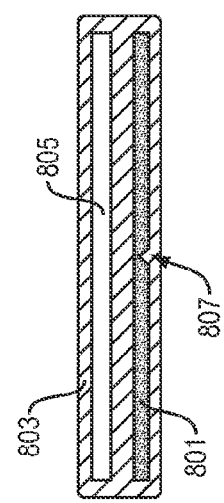
Figure 8C:
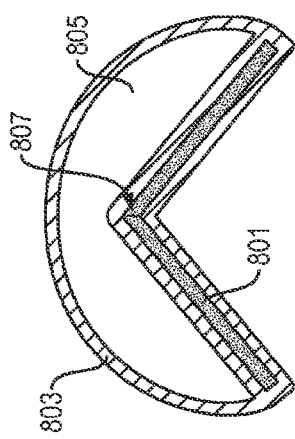
Figure 8D:
Figure 8E:
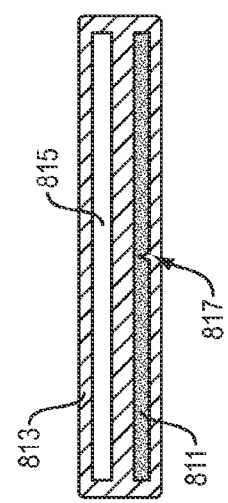
Figure 8F:
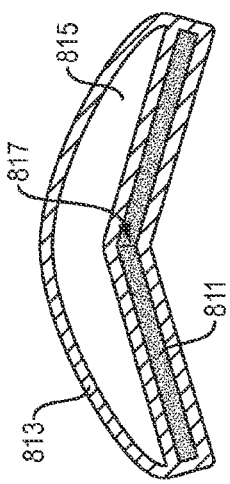

FIGS. 8A, 8B, 8C, 8D, 8E and 8F together illustrate how the angle of a notch in the surface of a shape controller can determine the angle of bending of the bladder, when the bladder is inflated. The angle subtended by the notch in FIGS. 8A and 8B is smaller (sharper) than the angle subtended by the notch in FIGS. 8D and 8E. When the bladders inflate, as shown in FIGS. 8C and 8F, the bladder with the narrow angle notch bends at a wider angle than the angle at which the bladder with the wide angle notch bends.

FIG. 8A shows a shape controller 801 with a narrow angle notch 807 in it. FIG. 8B shows this shape controller 801 embedded within a wall 803 of a bladder. FIG. 8C shows this bladder in an inflated state.

FIG. 8D shows a shape controller 811 with a wide angle notch 817 in it. FIG. 8E shows this shape controller embedded within a wall 813 of a bladder. FIG. 8F shows this bladder in an inflated state.

In FIGS. 8B, 8C, 8E and 8F, the wall 803, 813 of the bladder encloses a cavity 805, 815. The cavity contains a fluid (e.g., air).

FIGS. 9A, 9B, 9C, and 9D together illustrate how the locations of creases in a shape controller can determine where the bladder bends, when the bladder is inflated.

In FIG. 9A, the creases are located at four positions (e.g., 901, 903) near an end of the shape controller 900. In FIG. 9B, an inflated bladder bends at these four positions.

In FIG. 9C, the creases are located at four other positions (e.g., 951, 953) near the center of the shape controller 950. In FIG. 9D, an inflated bladder bends at these four other positions.

FIGS. 10A, 10B, 10C, and 10D together illustrate how the density (or spatial frequency) of creases in a shape controller can determine where the smoothness of curvature a bladder, when the bladder is inflated.

In FIG. 10A, four creases are located at four positions (e.g., 1001, 1003) on a shape controller 1000. In FIG. 10B, an inflated bladder bends at these four positions.

In FIG. 10C, eight creases (e.g., 1051, 1053) are located at eight positions on a shape controller 1050. In FIG. 10D, an inflated bladder bends at these eight positions, resulting in a smoother curve than the curve formed by only four creases.

FIGS. 11A, 11B, 11C, and 11D together illustrate how the angle of creases in a shape controller can determine whether the bladder forms a planar spiral or a helix, when the bladder is inflated.

In FIG. 11A, creases (e.g., 1103, 1105) are oriented normal to the longitudinal axis 1107 of the shape controller 1100. In FIG. 11B, these creases cause a bladder to form a planar spiral, when the bladder is inflated.

In FIG. 11C, creases (e.g., 1153, 1155) are oriented at an angle, relative to the longitudinal axis 1157 of the shape controller 1150, which is not equal to 90 degrees. In FIG. 11D, these creases cause a bladder to form a helix 1161, when the bladder is inflated.

In exemplary implementations of this invention, a light source may be embedded in, may be adjacent to, or may comprise or be included in, a shape controller or a wall of a bladder. For example, a shape controller 1000, 1050, 1100, 1150 may include one or more light sources (e.g., 1008, 1009, 1058, 1059, 1108, 1109, 1158, 1159) configured to emit light and electrical conductors for providing power to the light sources. For example, the one or more light sources (e.g., 1008, 1009, 1058, 1059, 1108, 1109, 1158, 1159) may comprise light-emitting diodes (LEDs). For example, the shape controller 1150 may comprise (a) a creased paper layer, (b) light-emitting diodes (LEDs), and (c) conductive metal wires or strips for providing power to the LEDs. The creased paper, LEDs and wires or strips may be bonded together.

Figure 12A:
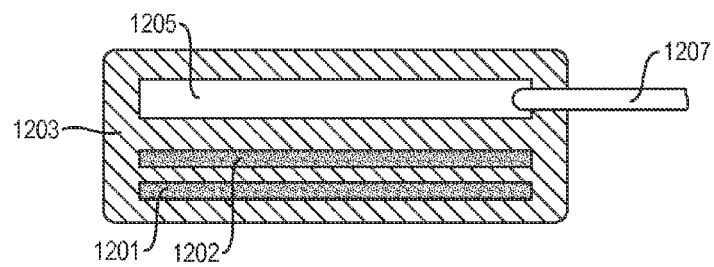
FIGS. 12A and 12B show views of an elongated bladder with jammable or inflatable shape controllers embedded in a wall of the bladder.
Figure 12B:
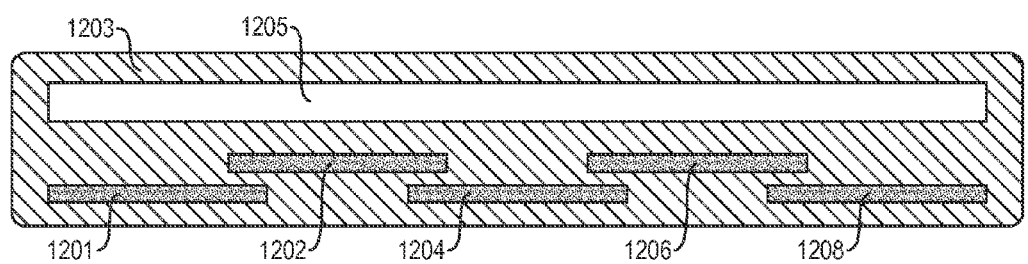

FIGS. 12A and 12B show views of a bladder. Jammable or inflatable shape controllers 1201, 1202, 1204, 1206, 1208 are embedded in a wall 1203 of the bladder. FIG. 12A is a cross-sectional view, with the cross-section being along a plane that is normal to the longitudinal axis of the bladder. FIG. 12B is a cross-sectional view, with the cross-section being along a plane that is parallel to the longitudinal axis of the bladder.

Figure 13:
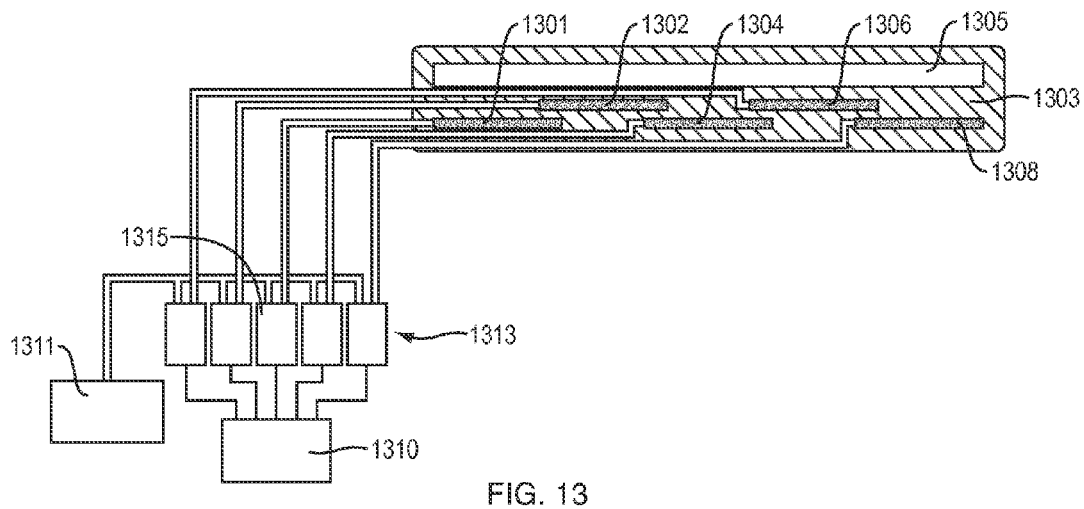
FIG. 13 shows a system comprising both (a) a bladder with shape controllers embedded in a wall of the bladder; and (b) apparatus for inflating and deflating the bladder and the shape controllers.

FIG. 13 shows a system comprising both (a) a bladder with shape controllers 1301, 1302, 1304, 1306, 1308 embedded in a wall 1303 of the bladder; and (b) apparatus for inflating and deflating the bladder and the shape controllers. The inflation/deflation apparatus includes one or more computer processors 1310 for controlling a pump 1311 and a set of valves 1313. The pump and valves are used to adjust pressure within (and thus to inflate or deflate) the shape controllers and the main bladder. For example, pump 1311 and valve 1315 can be used to control pressure within shape controller 1301.

For example, shape controllers 1301, 1302, 1304, 1306, 1308 may contain a jammable material (e.g., granular particles) that jam when compressed. In that case: (a) the pump and valves can jam and unjam the shape controllers by changing pressure of fluid (e.g., air or liquid) inside the shape controllers. For example, the pump and valves: (a) can create a partial vacuum inside one or more of the shape controllers, causing jammable material to be compressed and thus jammed, or (b) can increase the internal pressure inside the shape controllers, causing jammable material to become less dense and thus unjammed.

Or, for example, shape controllers 1301, 1302, 1304, 1306, 1308 themselves may be inflatable, and may become relatively rigid, incompressible and inflexible when fully inflated, and may be flexible when not inflated. In that case, as the main bladder (which surrounds cavity 1305) inflates, the rigid or flexible state of the inflatable shape controllers may control bending of the main bladder.

Figure 14C:
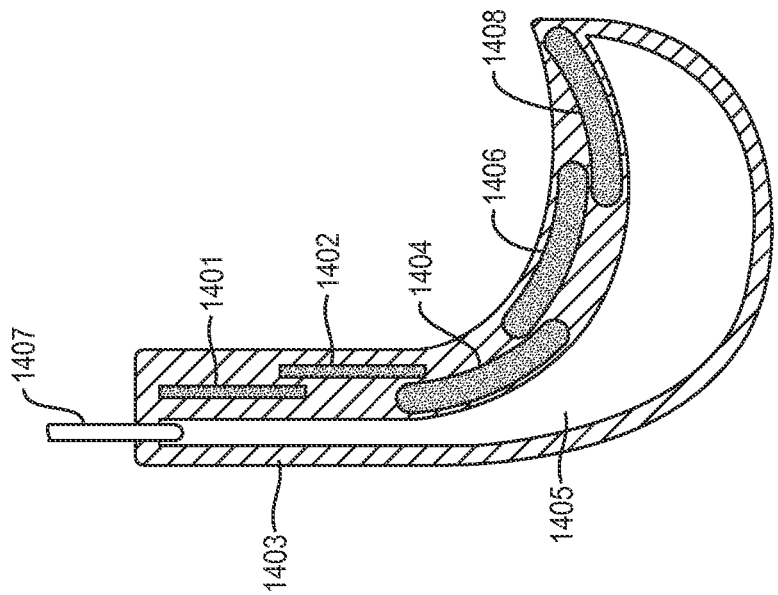
FIGS. 14A, 14B and 14C together show how jammable shape controllers can control the shape of a bladder, when the bladder is inflated.
Figure 14B:
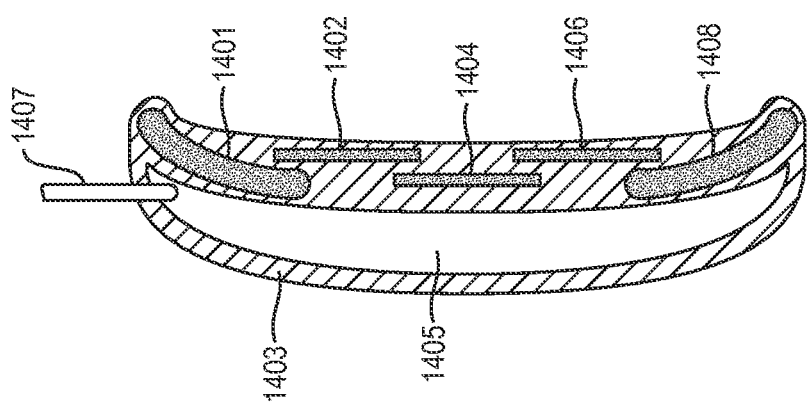
Figure 14A:
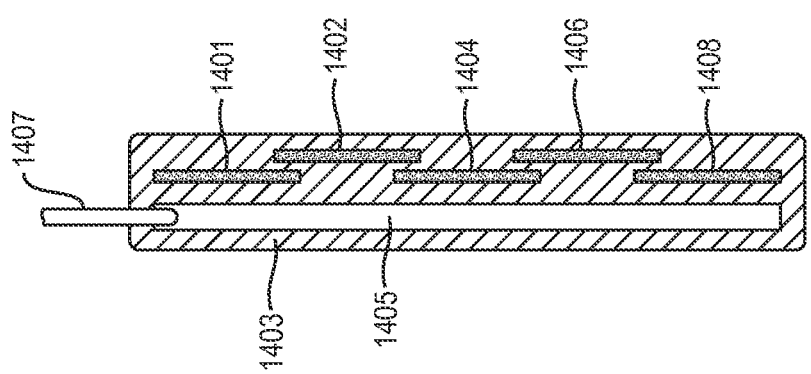

FIGS. 14A, 14B and 14C together show how jammable shape controllers can control the shape of a bladder, when the bladder is inflated.

FIGS. 14A, 14B and 14C each show a bladder with jammable shape controllers 1401, 1402, 1404, 1406, 1408 embedded in a wall 1403 of the bladder. Each of the jammable shape controllers 1401, 1402, 1404, 1406, 1408 contain a jammable material that jams (become rigid) when compressed. For each of these jammable shape controllers, jamming can occur inside the shape controller as follows: When fluid (e.g., air or gas) is removed from the shape controller through a pressure port, the internal pressure inside the shape controller drops, causing the shape controller to be compressed due to the higher pressure of ambient atmosphere pressing against the shape controller through the elastic wall of the bladder. Due to this compression, the jammable material becomes more dense and jams, and the shape controller becomes rigid. The jamming is reversible. When fluid is moved back into the shape controller, increasing the pressure of fluid within the shape controller, the shape controller ceases to be compressed, the jammable materials become less dense and cease to be jammed, and the shape controller becomes flexible again. For example, the jammable material may comprise a granular material, foam, glass or other complex liquid.

In FIG. 14A, the bladder is not inflated.

In the example shown in FIG. 14B: (a) the bladder is inflated; (b) three shape controllers 1402, 1404, 1406 are jammed and thus are rigid; (c) two other shape controllers 1401, 1408 are not jammed and thus are flexible; and (d) the inflated main bladder (which surrounds cavity 1405) bends where the unjammed, flexible shape controllers 1401, 1408 are located.

In the example shown in FIG. 14C: (a) the bladder is inflated; (b) two shape controllers 1401, 1402 are jammed and thus are rigid; (c) three other shape controllers 1404, 1406, 1406 are not jammed and thus are flexible; and (d) the inflated main bladder (which surrounds cavity 1405) bends where the unjammed, flexible shape controllers 1404, 1406, 1406 are located.

FIGS. 15A, 15B and 15C each show a bladder in which a shape controller includes a vessel 1504, 1524 filled with an addressable electrorheological (ER) fluid.

FIGS. 15A and 15B show a bladder with two sets of electrodes in the shape controller. In the example shown in FIGS. 15A and 15B: (a) a first set of electrodes is located in region 1511 of the shape controller, and includes six electrode pairs, including a pair consisting of electrodes 1505, 1507; (b) a second set of electrodes is located in region 1513 of the shape controller, and includes six electrode pairs. The electrodes are electrically connected to conductive plates (e.g., 1501, 1503) that are adjacent to the vessel 1504 filled with ER fluid. The electrodes and conductive plates may be used to apply a voltage (e.g., 1 kV) across the ER fluid, causing the ER fluid to stiffen. In FIG. 15A, the bladder is deflated. In FIG. 15B, the bladder is inflated and the electrodes/conductive plates in regions 1511, 1513 are applying a voltage across the ER fluid in those regions. This stiffens the vessel in those regions, preventing the bladder from bending in those regions. In other regions 1515, 1517, 1519 of the shape controller, voltage is not applied across the ER fluid. In these other regions, the ER fluid is not stiff, and the bladder bends in these regions.

FIG. 15C shows a bladder with four sets of electrodes in four regions of a shape controller (e.g., region 1521). The bladder is inflated. An electric field is applied across the ER fluid in the regions with sets of electrodes, causing the ER fluid in those regions to stiffen and not bend. In other regions (e.g., region 1523) of the shape controller, voltage is not applied across the ER fluid. In these other regions, the ER fluid is not stiff, and the bladder bends in these regions.

FIG. 16A shows a shape controller which comprises capacitive sensors (e.g., 1611, 1613) attached to a layer 1601 that has bends or creases (e.g., 1607, 1609) in it. FIG. 16B shows this shape controller, embedded in a wall 1603 of a bladder.

In FIGS. 12A, 12B, 13, 14A, 14B, 14C, 15A, 15B, 15C, 16A and 16B, an elastic wall (e.g., 1203, 1303, 1403, 1603) of the bladder encloses a cavity 1205, 1305, 1405, 1502, 1522, 1605. The cavity contains a fluid (e.g., air or a liquid). A port (e.g., 1207, 1407, 1509) may connect the cavity to apparatus for inflating or deflating the bladder. Via the port, pressure within the cavity may be controlled.

FIGS. 17A, 17B, 17C, 17D show a multi-state inflatable surface formed by three layers 1701, 1703, 1705. The middle layer 1705 has a circular hole 1707 in it. FIG. 17A shows an exploded view of three layers 1701, 1703, 1705 in the surface. FIG. 17B shows a top view of the surface. FIG. 17C shows a system for inflating and deflating the surface. The system includes one or more computer processors 1715 for controlling one or more pumps 1713 and one or more valves 1717, in order to control pressure within a bladder that is located underneath the surface 1711. FIG. 17C shows the surface in a partially inflated state, with one level of protuberance. FIG. 17D shows the surface in a fully inflated state, with two layers 1721, 1723 of protuberances.

Figure 18A:
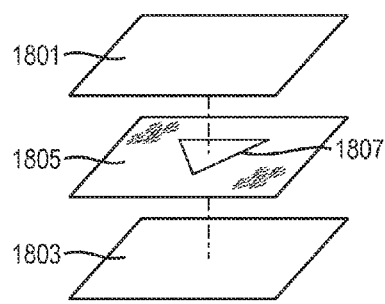
FIGS. 18A, 18B, 18C and 18D show a multi-state inflatable surface formed by three layers, in which the middle layer has a triangular hole in it.
Figure 18B:
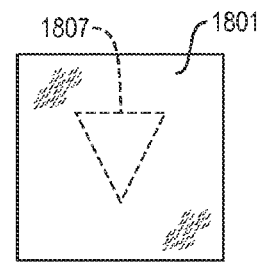
Figure 18C:
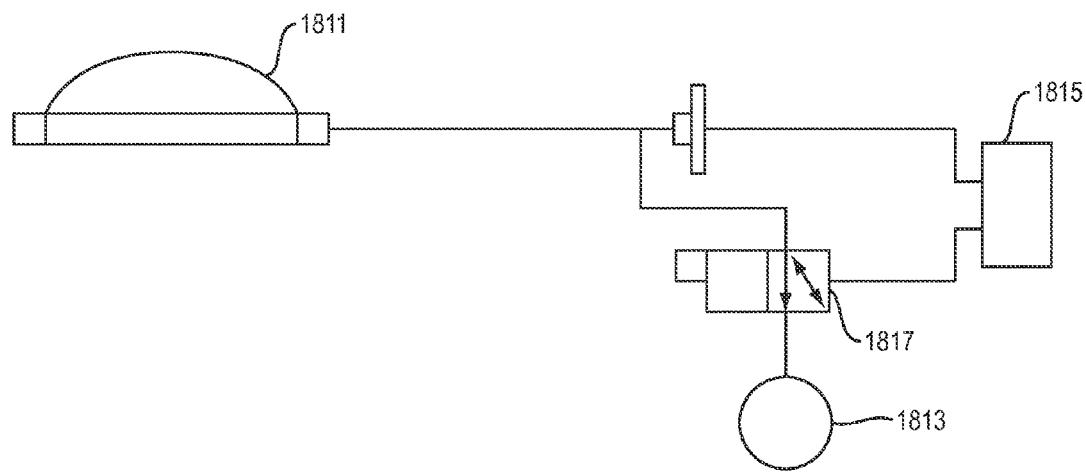
Figure 18D:
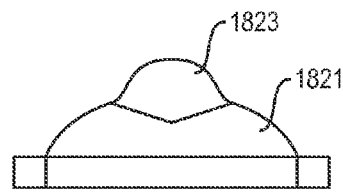

FIGS. 18A, 18B, 18C and 18D show a multi-state inflatable surface formed by three layers 1801, 1803, 1805. The middle layer 1805 has a triangular hole 1807 in it. FIG. 18A shows an exploded view of three layers 1801, 1803, 1805 in the surface. FIG. 18B shows a top view of the surface. FIG. 18C shows a system for inflating and deflating the surface. The system includes one or more computer processors 1815 for controlling one or more pumps 1813 and one or more valves 1817, in order to control pressure within a bladder that is located underneath the surface 1811. FIG. 18C shows the surface in a partially inflated state, with one level of protuberance. FIG. 18D shows the surface in a fully inflated state, with two layers 1821, 1823 of protuberances.

FIGS. 19A, 19B, 19C and 19D show a multi-state inflatable surface formed by three layers 1901, 1903, 1905. The middle layer 1905 has a cross-shaped hole 1907 in it. FIG. 19A shows an exploded view of three layers 1901, 1903, 1905 in the surface. FIG. 19B shows a top view of the surface. FIG. 19C shows a system for inflating and deflating the surface. The system includes one or more computer processors 1915 for controlling one or more pumps 1913 and one or more valves 1917, in order to control pressure within a bladder that is located underneath the surface 1911. FIG. 19C shows the surface in a partially inflated state, with one level of protuberance. FIG. 19D shows the surface in a fully inflated state, with two layers 1921, 1923 of protuberances.

Figure 20A:
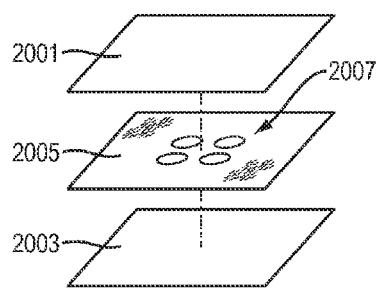
FIGS. 20A, 20B, 20C and 20D show a multi-state inflatable surface formed by three layers, in which the middle layer has a pattern of four circular holes in it.
Figure 20B:
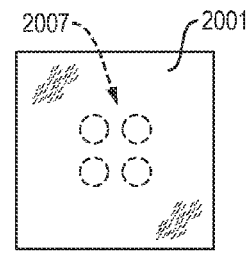
Figure 20C:
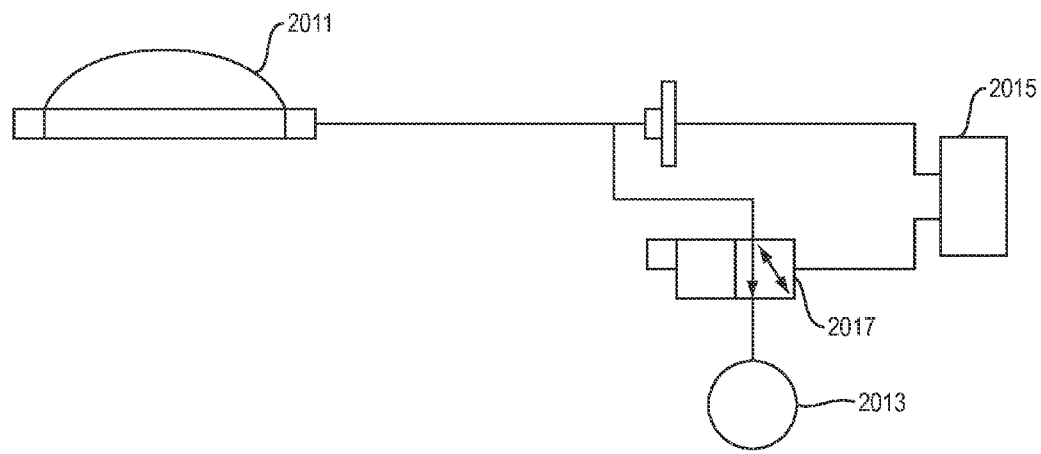
Figure 20D:
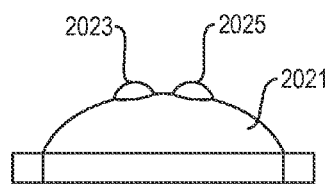

FIGS. 20A, 20B, 20C and 20D show a multi-state inflatable surface formed by three layers 2001, 2003, 2005. The middle layer 2005 has a pattern of four circular holes 2007 in it. FIG. 20A shows an exploded view of three layers 2001, 2003, 2005 in the surface. FIG. 20B shows a top view of the surface. FIG. 20C shows a system for inflating and deflating the surface. The system includes one or more computer processors 2015 for controlling one or more pumps 2013 and one or more valves 2017, in order to control pressure within a bladder that is located underneath the surface 2011. FIG. 20C shows the surface in a partially inflated state, with one level of protuberance. FIG. 20D shows the surface in a fully inflated state, with two layers of protuberances (a first layer with one protuberance 2021, and a second level of four protuberances, including bumps 2023, 2025).

Figure 21A:
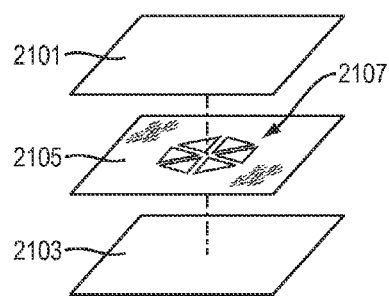
FIGS. 21A, 21B, 21C and 21D show a multi-state inflatable surface formed by three layers, in which the middle layer has a pattern of six triangular holes in it.
Figure 21B:
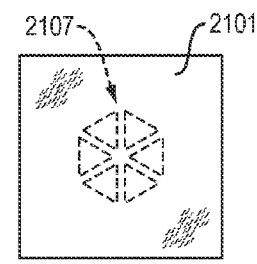
Figure 21C:
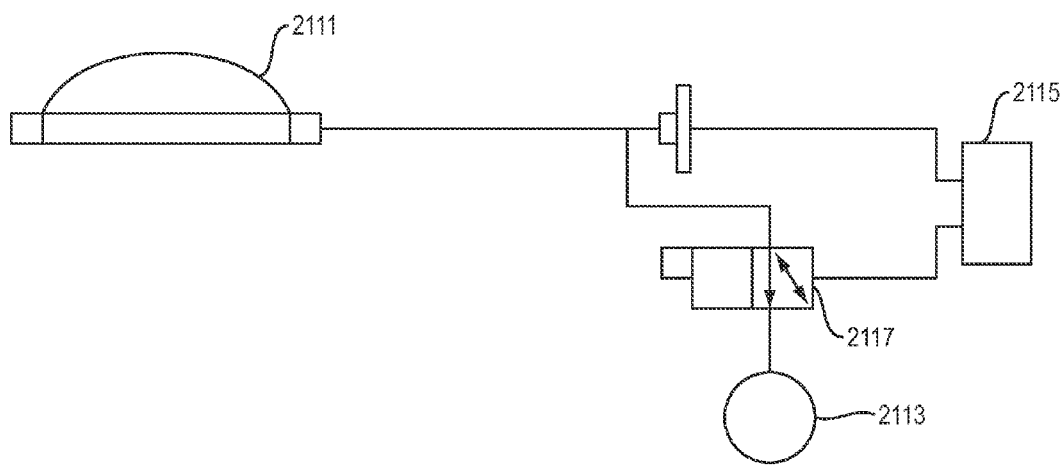
Figure 21D:
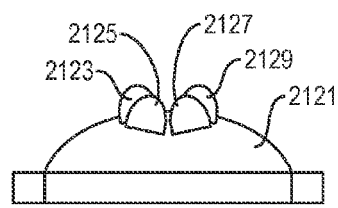

FIGS. 21A, 21B, 21C and 21D show a multi-state inflatable surface formed by three layers 2101, 2103, 2105. The middle layer 2105 has a pattern of six triangular holes 2107 in it. FIG. 21A shows an exploded view of three layers 2101, 2103, 2105 in the surface. FIG. 21B shows a top view of the surface. FIG. 21C shows a system for inflating and deflating the surface. The system includes one or more computer processors 2115 for controlling one or more pumps 2113 and one or more valves 2117, in order to control pressure within a bladder that is located underneath the surface 2111. FIG. 21C shows the surface in a partially inflated state, with one level of protuberance. FIG. 21D shows the surface in a fully inflated state, with two layers of protuberances (a first layer with one protuberance 2121, and a second level of protuberances, including bumps 2123, 2125, 2127, 2129).

Figure 22A:
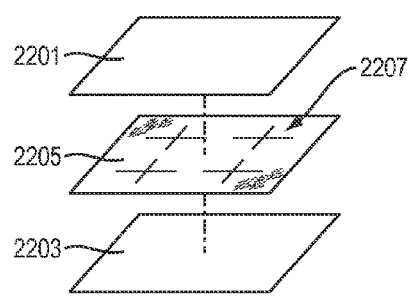
FIGS. 22A, 22B, 22C and 22D show a multi-state inflatable surface formed by three layers, in which the middle layer has a pattern of four cross-shaped holes in it.
Figure 22B:
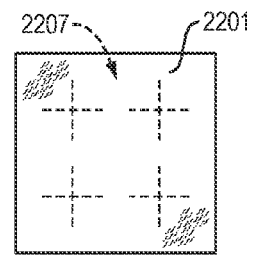
Figure 22C:
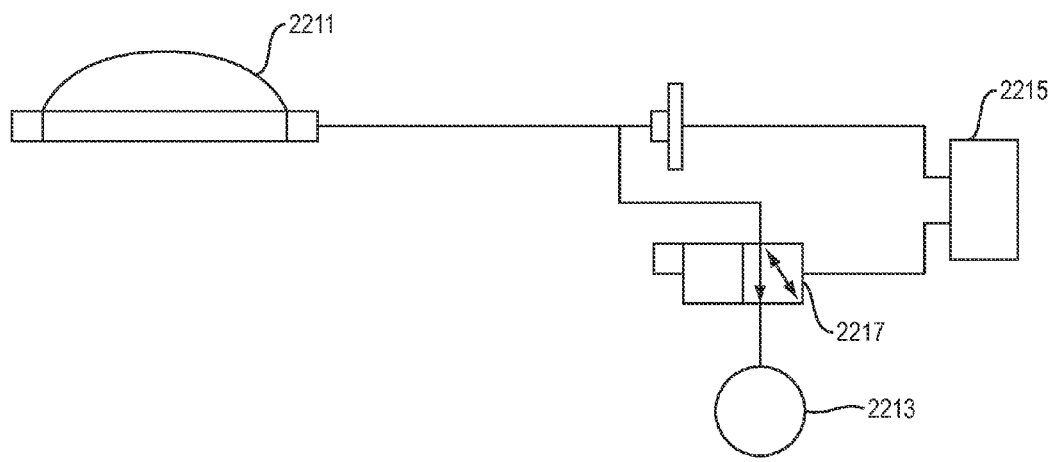
Figure 22D:
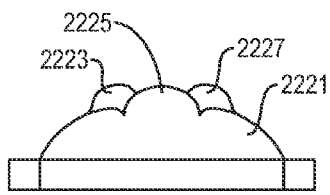

FIGS. 22A, 22B, 22C and 22D show a multi-state inflatable surface formed by three layers 2201, 2203, 2205. The middle layer 2205 has a pattern of four cross-shaped holes 2207 in it. FIG. 22A shows an exploded view of three layers 2201, 2203, 2205 in the surface. FIG. 22B shows a top view of the surface. FIG. 22C shows a system for inflating and deflating the surface. The system includes one or more computer processors 2215 for controlling one or more pumps 2213 and one or more valves 2217, in order to control pressure within a bladder that is located underneath the surface 2211. FIG. 22C shows the surface in a partially inflated state, with one level of protuberance. FIG. 22D shows the surface in a fully inflated state, with two layers of protuberances (a first layer with one protuberance 2221, and a second level of four protuberances, including bumps 2223, 2225, 2227).

Figure 23A:
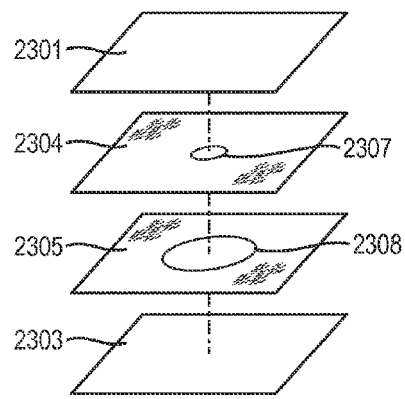
FIGS. 23A, 23B, 23C and 23D show a multi-state inflatable surface formed by four layers, in which a central layer has a small circular hole in it, and another central layer has a larger circular hole in it.
Figure 23B:
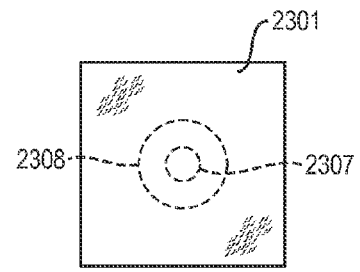
Figure 23C:
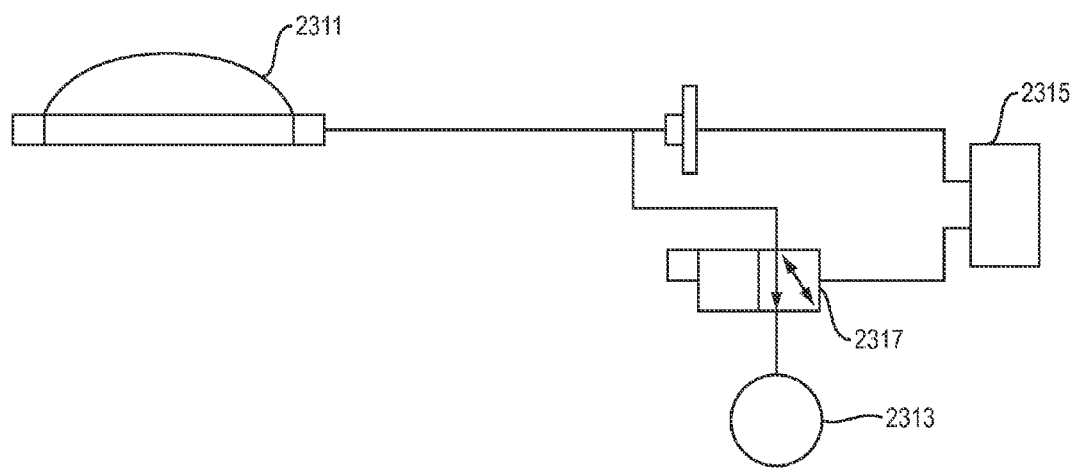
Figure 23D:
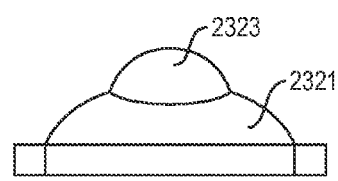
Figure 23E:
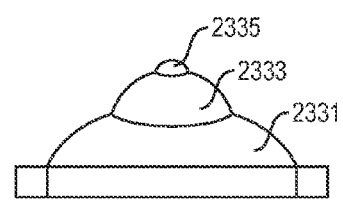
FIG. 23E shows the surface in a fully inflated state, with three layers of protuberances.

FIGS. 23A, 23B, 23C and 23D show a multi-state inflatable surface formed by four layers 2301, 2303, 2304, 2305. A central layer 2304 has a small circular hole 2307 in it. Another central layer 2305 has a large circular hole 2308 in it. FIG. 23A shows an exploded view of four layers 2301, 2303, 2304, 2305 in the surface. FIG. 23B shows a top view of the surface. FIG. 23C shows a system for inflating and deflating the surface. The system includes one or more computer processors 2315 for controlling one or more pumps 2313 and one or more valves 2317, in order to control pressure within a bladder that is located underneath the surface 2311. FIG. 23C shows the surface in a partially inflated state, with one level of protuberance. FIG. 23D shows the surface in a more (but not fully) inflated state, with two layers of protuberances (a first layer with protuberance 2321, and a second level with protuberance 2323). FIG. 23E shows the surface in a fully inflated state, with three levels of protuberances (a first layer with protuberance 2331, a second layer with protuberance 2333, and a third layer with protuberance 2335).

Figure 24A:
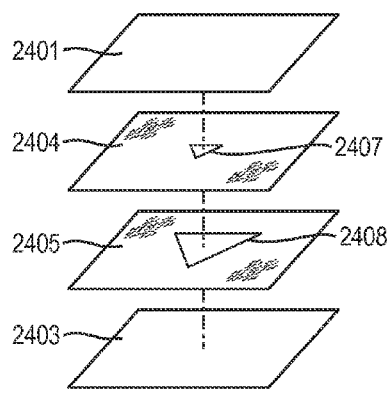
FIGS. 24A, 24B, 24C and 24D show a multi-state inflatable surface formed by four layers, in which a central layer has a small triangular hole in it, and another central layer has a larger triangular hole in it.
Figure 24B:
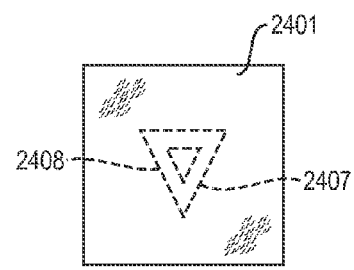
Figure 24C:
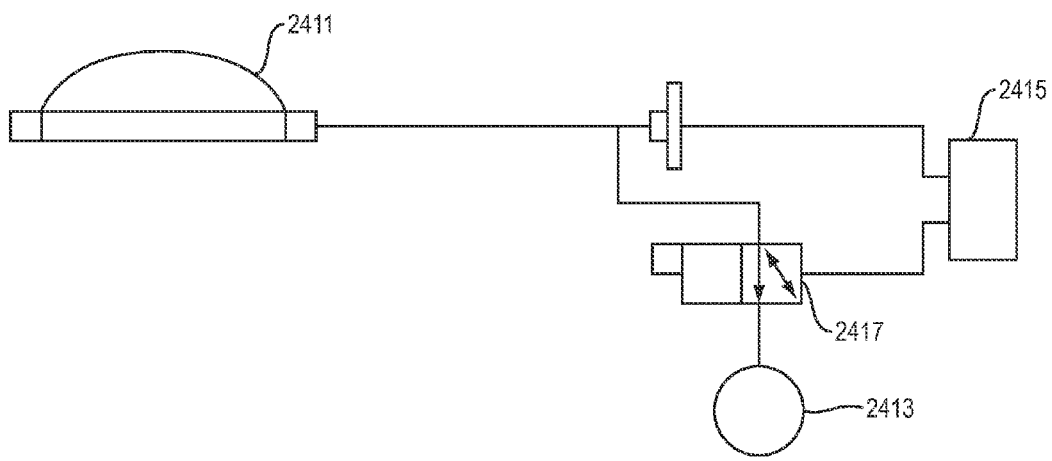
Figure 24D:
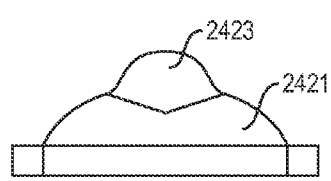
Figure 24E:
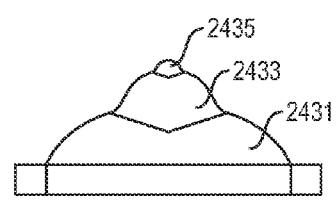
FIG. 24E shows the surface in a fully inflated state, with three layers of protuberances.

FIGS. 24A, 24B, 24C and 24D show a multi-state inflatable surface formed by four layers 2401, 2403, 2404, 2405. A central layer 2404 has a small triangular hole 2407 in it. Another central layer 2405 has a large triangular hole 2408 in it. FIG. 24A shows an exploded view of four layers 2401, 2403, 2404, 2405 in the surface. FIG. 24B shows a top view of the surface. FIG. 24C shows a system for inflating and deflating the surface. The system includes one or more computer processors 2415 for controlling one or more pumps 2413 and one or more valves 2417, in order to control pressure within a bladder that is located underneath the surface 2411. FIG. 24C shows the surface in a partially inflated state, with one level of protuberance. FIG. 24D shows the surface in a more (but not fully) inflated state, with two layers of protuberances (a first layer with protuberance 2421, and a second level with protuberance 2423). FIG. 24E shows the surface in a fully inflated state, with three levels of protuberances (a first layer with protuberance 2431, a second layer with protuberance 2433, and a third layer with protuberance 2435).

Figure 25A:
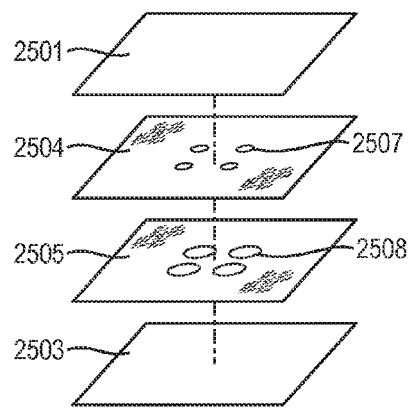
FIGS. 25A, 25B, 25C and 25D show a multi-state inflatable surface formed by four layers, in which a central layer has a pattern of four small circular holes in it, and another central layer has a pattern of four larger circular holes in it.
Figure 25B:
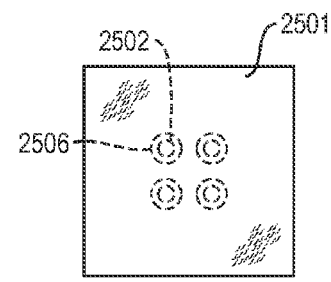
Figure 25C:
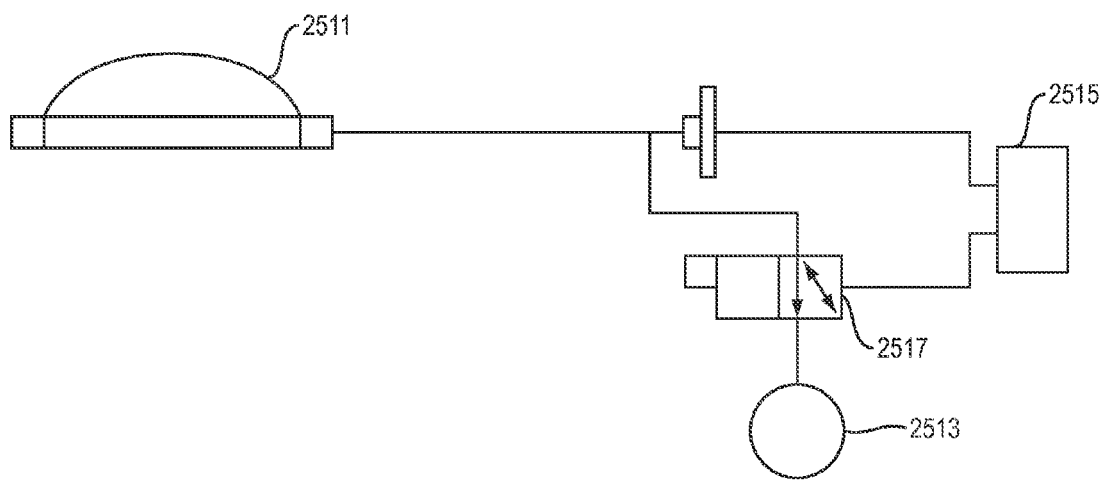
Figure 25D:
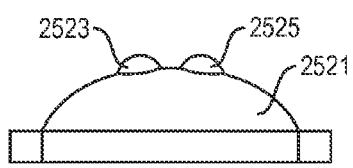
Figure 25E:
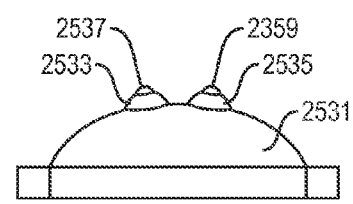
FIG. 25E shows the surface in a fully inflated state, with three layers of protuberances.

FIGS. 25A, 25B, 25C and 25D show a multi-state inflatable surface formed by four layers 2501, 2503, 2504, 2505. A central layer 2504 has a pattern of small circular holes 2507 in it. Another central layer 2505 has a pattern of large circular holes 2508 in it. FIG. 25A shows an exploded view of four layers 2501, 2503, 2504, 2505 in the surface. FIG. 25B shows a top view of the surface. Viewed from the top, each small circular hole (e.g., 2502) is surrounded by a larger hole (e.g., 2506). FIG. 25C shows a system for inflating and deflating the surface. The system includes one or more computer processors 2515 for controlling one or more pumps 2513 and one or more valves 2517, in order to control pressure within a bladder that is located underneath the surface 2511. FIG. 25C shows the surface in a partially inflated state, with one level of protuberance. FIG. 25D shows the surface in a more (but not fully) inflated state, with two layers of protuberances: a first layer with protuberance 2521, and a second level with protuberances (e.g., 2523, 2525). FIG. 25E shows the surface in a fully inflated state, with three levels of protuberances: a first layer with protuberance 2531, a second layer with protuberances (e.g., 2533, 2535), and a third layer with protuberances (e.g., 2537, 2539.)

Figure 26A:
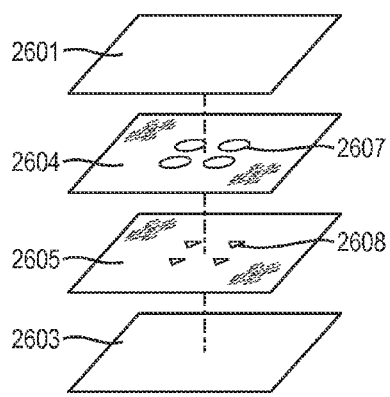
FIGS. 26A, 26B, 26C and 26D show a multi-state inflatable surface formed by four layers, in which a central layer has a pattern of four circular holes in it, and another central layer has a pattern of four triangular holes in it.
Figure 26B:
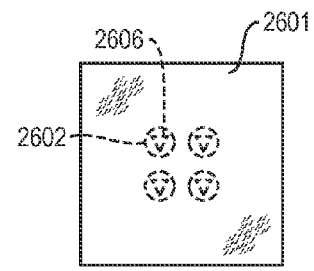
Figure 26C:
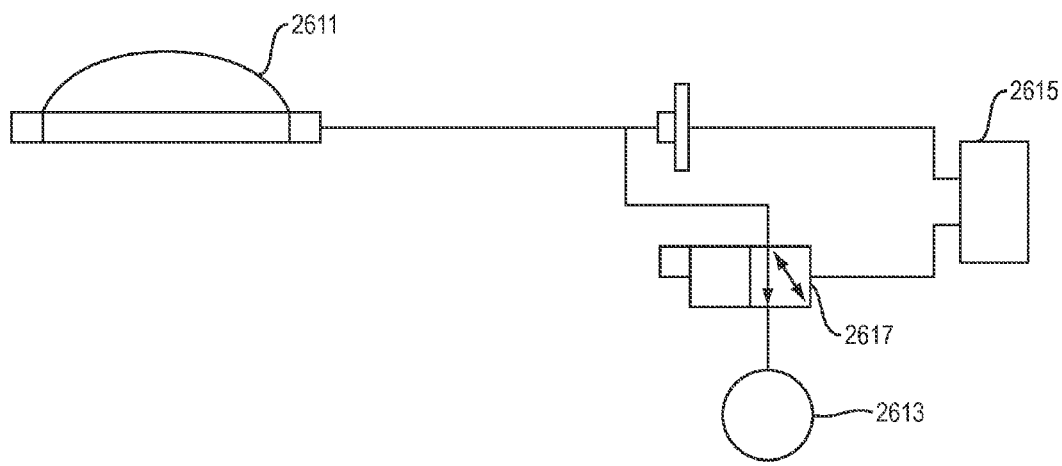
Figure 26D:
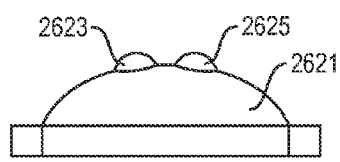
Figure 26E:
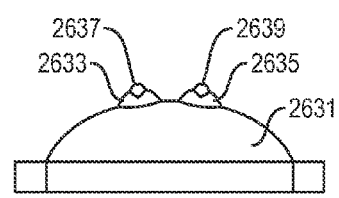
FIG. 26E shows the surface in a fully inflated state, with three layers of protuberances.

FIGS. 26A, 26B, 26C and 26D show a multi-state inflatable surface formed by four layers 2601, 2603, 2604, 2605. A central layer 2604 has a pattern of circular holes 2607 in it. Another central layer 2605 has a pattern of triangular holes 2608 in it. FIG. 26A shows an exploded view of four layers 2601, 2603, 2604, 2605 in the surface. FIG. 26B shows a top view of the surface. Viewed from the top, each triangular hole (e.g., 2606) is surrounded by a circular hole (e.g., 2602). FIG. 26C shows a system for inflating and deflating the surface. The system includes one or more computer processors 2615 for controlling one or more pumps 2613 and one or more valves 2617, in order to control pressure within a bladder that is located underneath the surface 2611. FIG. 26C shows the surface in a partially inflated state, with one level of protuberance. FIG. 26D shows the surface in a more (but not fully) inflated state, with two layers of protuberances: a first layer with protuberance 2621, and a second level with protuberances (e.g., 2623, 2625). FIG. 26E shows the surface in a fully inflated state, with three levels of protuberances: a first layer with protuberance 2631, a second layer with protuberances (e.g., 2633, 2635), and a third layer with protuberances (e.g., 2637, 2639.)

FIGS. 27, 28A, 28B, 29A, 29B and 29C show examples of an addressable, dynamic shape display.

Figure 27:
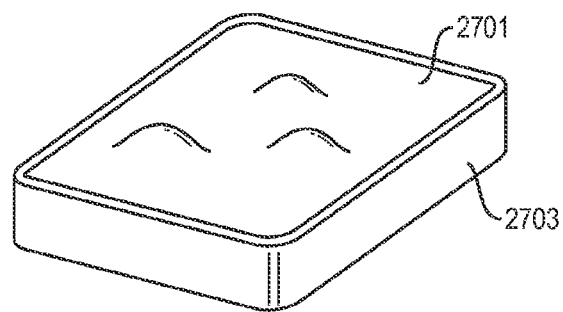
FIGS. 27, 28A, 28B, 29A, 29B and 29C show examples of an addressable, dynamic shape display.

FIG. 27 shows a perspective view of a shape display, including a display surface 2701 and a frame 2703.

Figure 28A:
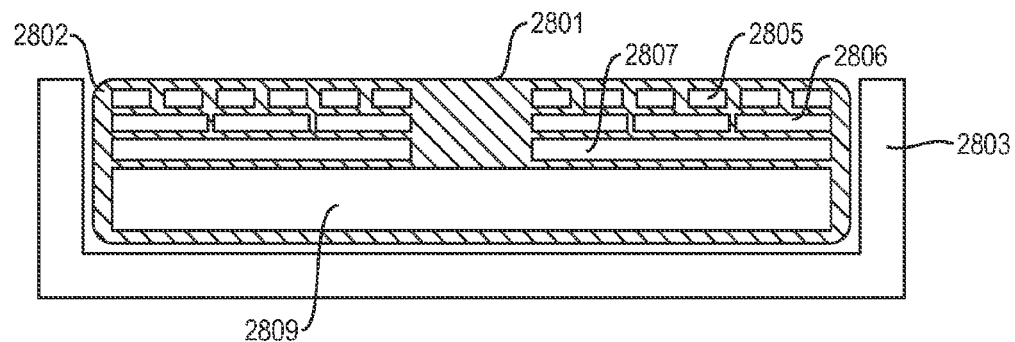

FIG. 28A shows a shape display with a set of embedded bladders for controlling the shape of a surface 2801 of the display. In the example shown in FIG. 28A, the bladders are embedded within an elastic wall 2802. The set of bladders include four levels of bladders, which increase in size from top to bottom. For example: (a) bladder 2805 is in the first, uppermost level; (b) bladder 2806 is in the second level; (c) bladder 2807 is in the third level; (d) bladder 2809 is in the fourth (bottom) level, and (e) bladder 2805 is smaller than bladder 2806, which in turn is smaller than bladder 2807, which in turn is smaller than bladder 2809.

Figure 28B:
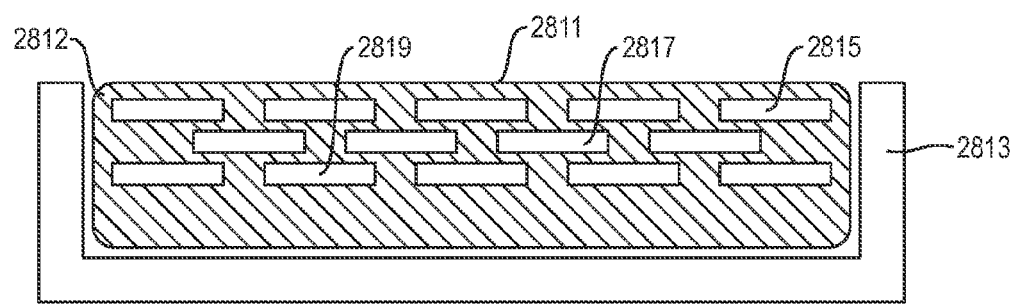

FIG. 28B shows a shape display with a different set of embedded bladders for controlling the shape of a surface 2811 of the display. In the example shown in FIG. 28A, the bladders are embedded within an elastic wall 2812. The set of bladders include three levels of bladders, which are all the same size. For example: (a) bladder 2815 is in the first, uppermost level; (b) bladder 2817 is in the second level; (c) bladder 2819 is in the third level; (d) bladders 2815, 2817 and 2819 are all the same size.

In the examples shown in FIGS. 28A and 28B, one or more pumps and valves may be used to inflate or deflate the embedded bladders. Optionally, one or more of the embedded bladders may contain a jammable material.

Figure 29A:
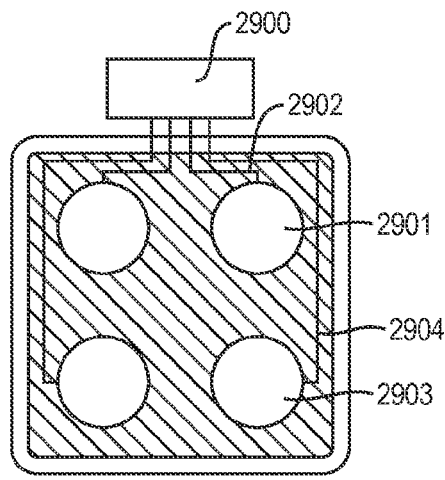
Figure 29B:
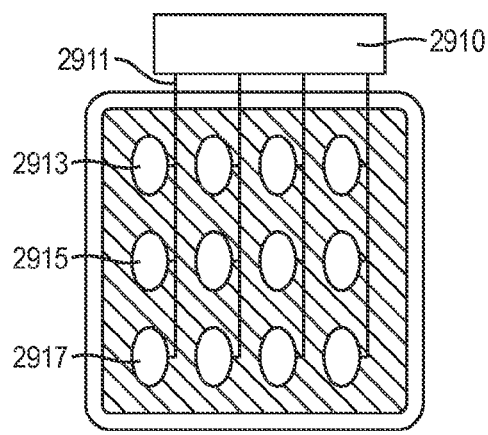
Figure 29C:
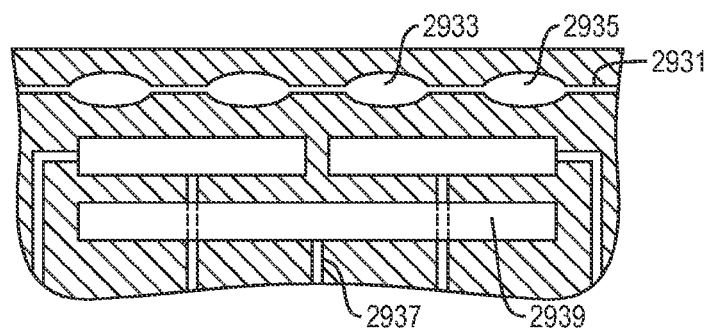

FIGS. 29A, 29B and 29C show examples of ways in which bladders in a display can be controlled.

In FIG. 29A, each bladder is separately controlled. For example: (a) the inflation/deflation state of bladder 2901 is separately controlled via pressure port 2902; and (b) the inflation/deflation state of bladder 2903 is separately controlled via pressure port 2904.

In FIG. 29B, a set of three bladders shares a common control. For example, the inflation/deflation state of bladders 2913, 2915 and 2917 are controlled by a common pressure port 2911.

In the examples shown in FIGS. 29A and 29B, a control unit 2900, 2910 includes one or more computer processors, pumps and valves to control pressure in each of the respective pressure ports.

In FIG. 29C, some bladders (e.g., 2933, 2935) are controlled via horizontal control lines (e.g., 2931), and other bladders (e.g., 2939) are controlled via vertical control lines (e.g., 2937).

Optionally, in the examples shown in FIGS. 29A, 29B and 29C, one or more of the embedded bladders may contain a jammable material.

FIGS. 30A, 30B, 30C, 30D and 30D show an addressable, dynamic shape display, displaying different shapes. In FIG. 30A, the display surface has a shape 3001 that comprises multiple protuberances which vary in size and shape. In FIG. 30B, the display surface has a shape 3003 that is a smooth curve. In FIG. 30C, the display surface has a shape 3005 that is sinusoidal (and thus periodic). In FIG. 30D, the display surface has a shape 3007 that includes a gnarly protuberance rising from a flat area. In FIG. 30E, the display surface has a shape 3009 that is flat 3009.

In exemplary implementations of this invention, one or more electronic processors are specially adapted: (1) to control the operation of hardware component, including any pump or valve, including to control the inflation or deflation state of any bladder; (2) to perform calculations to calculate pressure; (3) to perform calculations to calculate an inflation or deflation state; (4) to perform computations to calculate a shape of a surface, including a shape resulting from the inflation/deflation state of one or more bladders embedded in or adjacent to the surface; (5) to process sensor measurements, including to determine the position or shape of an object; (6) to receive signals indicative of human input; (7) to output signals for controlling transducers for outputting information in human perceivable format; and (8) to process data, perform computations, and control the read/write of data to and from memory devices. The one or more processors may be located in any position or position within or outside of the inflation/deflation apparatus. For example: (a) at least some of the one or more processors may be housed together with other components of the inflation/deflation apparatus, such as pump or valves; and (b) at least some of the one or more processors may be remote from other components of the inflation/deflation apparatus. The one or more processors may be connected to each other or to other components in the system either (a) wirelessly, (b) by wired connection, or (c) by a combination of wired and wireless connections. For example, one or more electronic processors (e.g., 303, 1310, 1715, 1815, 1915, 2015, 2115, 2215, 2315, 2415, 2515, 2615) may be housed in a computer or in a microcontroller unit (MCU).

Definitions

Here are a few definitions and clarifications. As used herein:

The terms "a" and "an", when modifying a noun, do not imply that only one of the noun exists.

"Bladder" means a container that (a) is an article of manufacture and (b) is inflatable. A portion, but not all, of the walls of a bladder may be rigid. The term "bladder" does not include any human organ or other part of a human.

"Defined Term" means a term that is set forth in quotation marks in this Definitions section.

The term "comprise" (and grammatical variations thereof) shall be construed broadly, as if followed by "without limitation". If A comprises B, then A includes B and may include other things.

The term "contain" (and grammatical variations thereof) shall be construed broadly, as if followed by "without limitation". If A contains B, then A contains B and may contain other things. To "contain" does not require total enclosure. For example, a bladder can "contain" a fluid within a cavity formed by the bladder's walls, even if hole in a bladder wall creates an orifice connecting the cavity and the external environment. Likewise, a "container" does not require total enclosure. For example, a "container" may have a hole in a wall of the container, which creates an orifice connecting a cavity inside the container with the external environment.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The term "fluid" shall be construed broadly, and includes gases and liquids.

The term "for instance" means for example.

The term "hole" shall be construed broadly and includes any hole, cavity, gap, opening or orifice.

The terms "horizontal" and "vertical" shall be construed broadly. For example, "horizontal" and "vertical" may refer to two arbitrarily chosen coordinate axes in a Euclidian two dimensional space.

The term "include" (and grammatical variations thereof) shall be construed broadly, as if followed by "without limitation".

To "inflate" an object means to expand the total external surface area of the object by elastic deformation due to pressure of a fluid contained by the object. For example: (a) a balloon "inflates" as it swells and distends as air or water is forced into the balloon; and (b) the pressure that causes inflation can be gaseous pressure or liquid pressure. Similar terms, such as "inflation" and "inflatable", shall be construed in like manner. For example: (a) a balloon is "inflatable"; and (b) a balloon undergoes "inflation" as it swells and distends as air or water is forced into the balloon. Notwithstanding anything herein to the contrary, an object is not "inflatable," unless the object's total external surface area can change by at least 5% by elastic deformation due to pressure of fluid contained by the object.

A "jammable" material is a material that becomes more rigid as its density increases.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

As used herein, the term "set" does not include a so-called empty set (i.e., a set with no elements).

A "shape controller" means a device for controlling the shape of a bladder when the bladder inflates. A shape controller may comprise a single integral component, or may comprise a plurality of separate components. A shape controller may consist of a single material with uniform material properties. Or a shape controller may have material properties that are non-uniform over the spatial extent of the shape controller. For example: (a) a space controller may comprise a strip of paper with creases in it; (b) a space controller may comprise a strip of plastic with notches engraved in it; (c) a space controller may comprise a set of separate, fluid-filled bladders; or (d) a space controller may comprise a set of fluid-filled bladders and regions of an elastic wall between the bladders.

"Stiffness" is an extensive property. "Stiffness" has dimensions that can be described as newtons per meter. "Flexibility" is an extensive property, and is the complement of stiffness. Similar terms, such as "stiffer" or "flexible", shall be construed in like manner. For example, if object A has stiffness X, object B has stiffness Y, and X is greater than Y, then: (a) object A is stiffer than object B; and (b) object B is more flexible than object A.

"Strain" means a dimensionless measure of deformation. Applying stress to an object causes the object to undergo "strain", the "strain" being equal to the ratio of (i) displacement between particles in the body and (ii) a reference length.

As used herein, a "subset" of a set consists of less than all of the elements of the set.

The term "such as" means for example.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. In each case described in this paragraph, Applicant is acting as Applicant's own lexicographer.

Variations:

This invention may be implemented in many different ways, in addition to those described above.

Here are some non-limiting examples of how this invention may be implemented.

This invention may be implemented as an apparatus comprising a bladder, wherein: (a) the bladder includes a wall that at least partially surrounds a cavity in the bladder; (b) the bladder further includes a shape controller, which shape controller includes a first set of regions and a second set of regions; (c) the second set of regions is more flexible than the first set of regions; and (d) the shape controller is embedded within, or adjacent to, the wall, such that when the bladder is inflated, the overall shape of the bladder bends in areas adjacent to respective regions out of the second set of regions. Furthermore: (1) the shape controller may comprise paper and the second set of regions may comprise creases in the paper; (2) the second set of regions may comprise notches or indentations; (3) the first set of regions may comprise chambers, each of which chambers contains fluid; (4) the first set of regions may comprise chambers, each of which chambers contains jammable material; (5) the first set of regions may comprise multiple chambers, and each respective chamber, out of the multiple chambers in the first set of regions, may be configured to contain fluid at one or more pressures, including at a pressure such that the respective chambers are less compressible than the second set of regions; (6) the first set of regions may comprise a set of inflatable chambers; (7) each respective region, out of the second set of regions, may be elongated and may have an orientation along the length of the respective region; (8) the shape controller may be elongated and may have a first longitudinal axis along the length of the shape controller, and the orientations of the second set of regions may be perpendicular to the first longitudinal axis; (9) the shape controller may be elongated and may have a first longitudinal axis along the length of the shape controller, such that the orientations of the second set of regions are not perpendicular to the first longitudinal axis; (10) the wall may comprise an elastomer; (11) the cavity may contain air; (12) the apparatus may further comprise one or more pumps, one or more valves, and one or more computer processors for controlling the pumps and valves to control pressure of fluid in the cavity; and (13) the bladder may include one or more light emitting components.

This invention may be implemented as an apparatus comprising a bladder, wherein: (a) the bladder includes a wall that at least partially surrounds a cavity in the bladder; (b) the bladder further includes a shape controller, which shape controller includes a first set of regions and a second set of regions; (c) the first set of regions have a first range of magnitudes of flexural strength, and the second set of regions have a second range of magnitudes of flexural strength, which first and second ranges do not overlap, each magnitude in the first range being greater than each magnitude in the second range; and (d) the shape controller is embedded within, or adjacent to, the wall, such that when the bladder is inflated, the overall shape of the bladder bends in areas adjacent to respective regions out of the second set of regions.

This invention may be implemented as apparatus comprising a bladder, wherein: (a) the bladder contains fluid and includes a surface; (b) the surface comprises a first set of regions and a second set of regions; (c) in the second set of regions, the surface comprises a first layer and a second layer; (d) in the first set of regions, the surface comprises the first layer, but does not include the second layer; (e) the first layer has a first stiffness and the second layer has a second stiffness, the magnitude of the second stiffness being greater than the magnitude of the first stiffness; and (f) the surface is configured such that, during inflation of the bladder due to pressure of the fluid, the second set of regions undergo less strain than the first set of regions. The surface may further comprise a third set of regions, such that: (1) in the third set of regions, the surface comprises the first layer, the second layer and a third layer; (2) in the first and second set of regions, the surface does not include the third layer; (3) the third layer has a third stiffness, the magnitude of the third stiffness being greater than the magnitude of the second stiffness; and (4) the surface is configured such that, during the inflation, the third set of regions undergo less strain than the second set of regions. Also: (i) the fluid may comprise air; (ii) the fluid may comprise a liquid; and (iii) the apparatus may further comprise one or more pumps, one or more valves, and one or more computer processors for controlling the pumps and valves to control the pressure of the fluid.

CONCLUSION

While exemplary implementations are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention. Numerous modifications may be made by one of ordinary skill in the art without departing from the scope of the invention.

What is claimed is:

1. An apparatus comprising a bladder, a first set of chambers, a second set of chambers, jammable material, a pump and valves, wherein:
    (a) the bladder at least partially surrounds a cavity;
    (b) the first and second sets of chambers are embedded in a wall of the bladder;
    (c) the jammable material is located in the first and second sets of chambers;
    (d) the pump and the valves are configured to adjust how much fluid is inside the first set of chambers, including by moving fluid out of the first set of chambers sufficiently such that the first set of chambers becomes more rigid than the second set of chambers; and
    (e) the bladder is configured such that, when the first set of chambers is more rigid than the second set of chambers and the bladder is inflated, the overall shape of the bladder bends in areas selected from the second set of chambers.

* * * * *